(12) United States Patent
Venugopal et al.

(10) Patent No.: US 8,558,250 B2
(45) Date of Patent: Oct. 15, 2013

(54) DISPLAYS WITH EMBEDDED MEMS SENSORS AND RELATED METHODS

(75) Inventors: Sameer M. Venugopal, Chandler, AZ (US); Narendra V. Lakamraju, Tempe, AZ (US)

(73) Assignee: Arizona Board of Regents, a body corporate of the State of Arizona, Acting for and on behalf of Arizona State University, Scottsdale, AZ (US)

( * ) Notice: Subject to any disclaimer, the term of this patent is extended or adjusted under 35 U.S.C. 154(b) by 39 days.

(21) Appl. No.: 13/192,357

(22) Filed: Jul. 27, 2011

(65) Prior Publication Data

US 2012/0175644 A1 Jul. 12, 2012

Related U.S. Application Data

(63) Continuation of application No. PCT/US2009/068523, filed on Dec. 17, 2009.

(60) Provisional application No. 61/147,683, filed on Jan. 27, 2009, provisional application No. 61/174,438, filed on Apr. 30, 2009, provisional application No. 61/222,451, filed on Jul. 1, 2009.

(51) Int. Cl.
*H01L 27/15* (2006.01)
*H01L 33/08* (2010.01)

(52) U.S. Cl.
USPC ...... 257/88; 257/419; 257/415; 257/E21.121; 257/E33.055; 438/24; 438/53

(58) Field of Classification Search
USPC .................. 257/88, 419, E27.121, E33.055; 438/24, 53
See application file for complete search history.

(56) References Cited

U.S. PATENT DOCUMENTS

| | | | |
|---|---|---|---|
| 7,425,749 B2 * | 9/2008 | Hartzell et al. | 257/414 |
| 7,663,794 B2 * | 2/2010 | Cummings | 359/224.1 |
| 2003/0043157 A1 | 3/2003 | Miles | |
| 2004/0030258 A1 | 2/2004 | Williams et al. | |
| 2004/0154400 A1 | 8/2004 | Johnson et al. | |
| 2005/0121734 A1 | 6/2005 | Degertekin et al. | |
| 2006/0067028 A1 * | 3/2006 | Floyd | 361/278 |
| 2006/0067651 A1 | 3/2006 | Chui | |
| 2007/0023851 A1 * | 2/2007 | Hartzell et al. | 257/414 |
| 2007/0090536 A1 * | 4/2007 | Sakai et al. | 257/778 |
| 2007/0099327 A1 | 5/2007 | Hartzell et al. | |
| 2008/0112035 A1 | 5/2008 | Cummings | |
| 2009/0103166 A1 | 4/2009 | Khazeni et al. | |
| 2010/0028633 A1 | 2/2010 | O'Rourke | |
| 2010/0079848 A1 | 4/2010 | Grasser et al. | |

OTHER PUBLICATIONS

Lakamraju, N. V. et al. "MEMS shock sensor fabricated on flexible substrate," Flexible Electronics & Displays Conference and Exhibition, Feb. 2009, ISBN: 978-1-4244-4338-3.

Jain, K. et al. "Flexible Electronics and Displays: High-Resolution, Roll-to-Roll, Projection Lithography and Photoablation Processing Technologies for High-Throughput Production," Proceedings of the IEEE, Aug. 2005, vol. 93, Issue. 8, pp. 1500-1510, ISSN: 0018-9219.

(Continued)

*Primary Examiner* — Thinh T Nguyen
(74) *Attorney, Agent, or Firm* — Bryan Cave LLP

(57) ABSTRACT

Embodiments of displays with embedded MEMS sensors and related methods are described herein. Other embodiments and related methods are also disclosed herein.

38 Claims, 12 Drawing Sheets

(56) References Cited

OTHER PUBLICATIONS

Arias, A. C. et al. "Flexible Printed Sensor Tape to Diagnose Brain Injury," 11th International Conference on Advanced Materials, Rio de Janeiro, Brazil, Sep. 2009.

Jackson, N. et al. "Flexible Chip-Scale Package and Interconnect for Implant able MEMS Movable Microelectrodes for the Brain," Journal of Microelectromec hanical systems, Apr. 2009, vol. 18, Issue 2, ISSN: 1057-7157.

Patent Cooperation Treaty PCT International Search Report and Written Opinion of the International Searching Authority for International Application No. PCT/US2010/055688, Sep. 15, 2011, 12 pages.

Zhou et al, "Flexible Substrate Micro-Crystalline Silicon and Gated Amorphous Silicon Strain Sensors," IEEE Transactions on Electron Devices, vol. 53, No. 2, Feb. 2006, pp. 380-385.

Saias et al, "An Above IC MEMS RF Switch," IEEE Journal of Solid-State Circuits, vol. 38, No. 12, Dec. 2003, pp. 2318-2324.

Schuenemann et al., "MEMS Modular Packaging and Interfaces," 2000 Electronic Components and Technology Conference, 2000, pp. 681-688.

Palasagaram et al., "MEMS Capacitive Pressure Sensor Array Fabricated Using Printed Circuit Processing Techniques," Industrial Electronics Society, IECON 2005, 31st Annual Conference of IEEE, 2005 IEEE, pp. 2357-2362.

Wu et al., "Modeling of Simultaneous Ground Shock and Airblast Pressure on Nearby Structures from Surface Explosions," International Journal of Impact Engineering 31 (2005), pp. 699-717.

Tan et al., "Enhanced Analytical Model for Micromachined Microphones," International MEMS Conference 2006, Institute of Physics Publishing, Journal of Physics: Conference Series 34 (2006), pp. 847-852.

Jawed et al., "A Switched Capacitor Interface for a Capacitive Microphone," Research in Microelectronics and Electronics 2006, Ph. D, 2006 IEEE, pp. 385-388.

Ko et al, "Touch Mode Capacitive Pressure Sensors for Industrial Applications," Tenth Annual International Workshop on Micro Electro Mechanical Systems Proceedings, MEMS '97, 1997 IEEE, pp. 284-289.

O'Rourke et al, "Active Matrix Electrophoretic Displays on Temporary Bonded Stainless Steel Substrates With 180° C a-Si:H TFTs," Society for Information Display, International Symposium Digest of Technical Papers, SID 08 Digest, pp. 422-424 (year 2008).

Arana et al., "Isotropic Etching of Silicon in Fluorine Gas for MEMS Micromachining," Institute of Physics Publishing, Journal of Micromechanics and Microengineering, J. Micromech. Microeng. 17 (2007), pp. 384-392.

Chan et al., "Gas Phase Pulse Etching of Silicon for MEMS With Xenon Difluoride," Proceedings of the 1999 IEEE Canadian Conference on Electrical and Computer Engineering, Shaw Conference Center Edmonton, Alberta, Canada, May 9-12, 1999, pp. 1637-1642, vol. 3.

Allee et al., "Threshold Voltage Instability in a-SI:H TFTs and the Implications for Flexible Displays and Circuits" in: Proceedings of the Army Science Conference (26th), Orlando, Florida, Dec. 1-4, 2008, pp. 1-8.

Patent Cooperation Treaty PCT International Search Report and Written Opinion of the International Searching Authority for International Application No. PCT/US09/68523, Sep. 1, 2010, 8 pages.

Patent Cooperation Treaty PCT International Search Report and Written Opinion of the International Searching Authority for International Application No. PCT/US09/68528, Sep. 1, 2010, 8 pages.

* cited by examiner

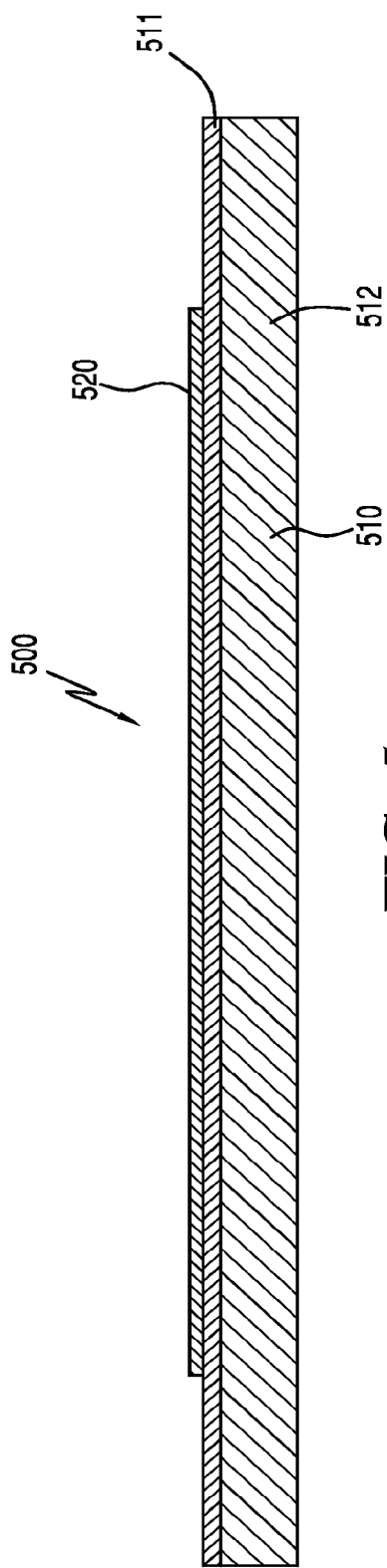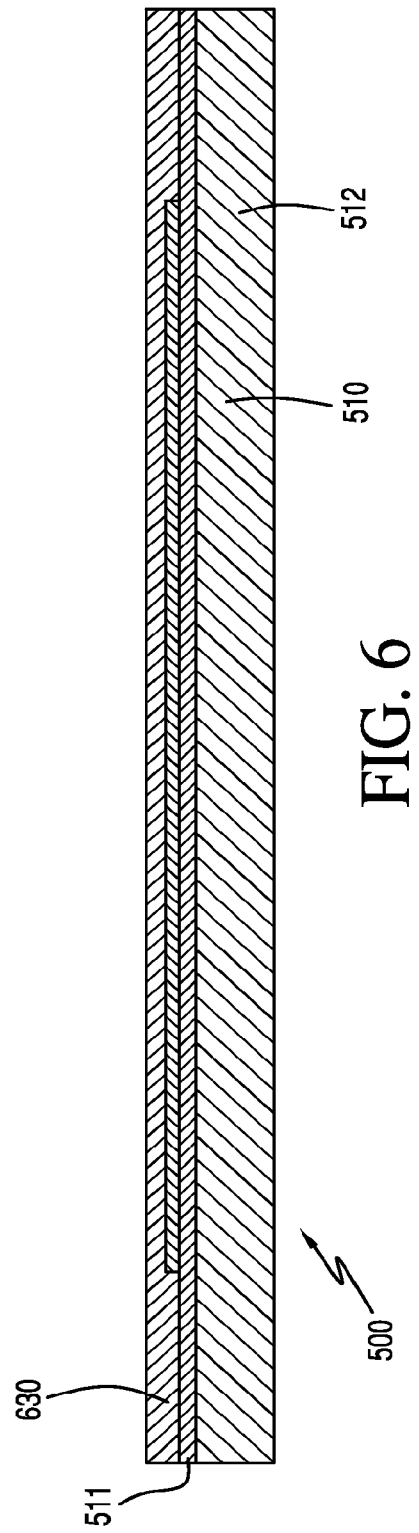

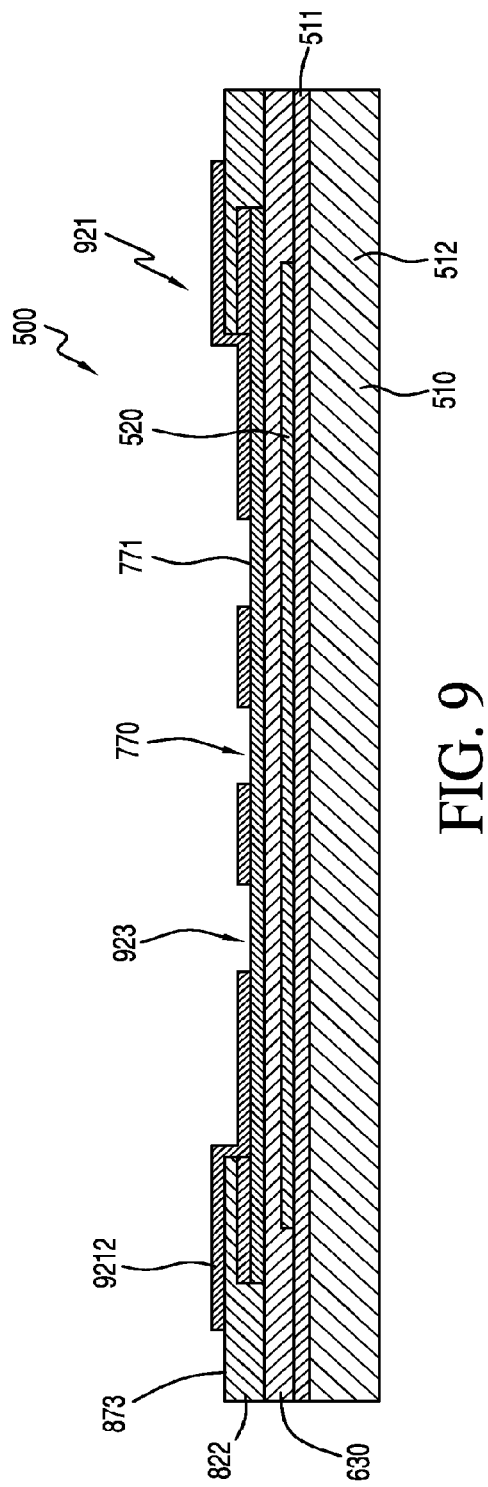
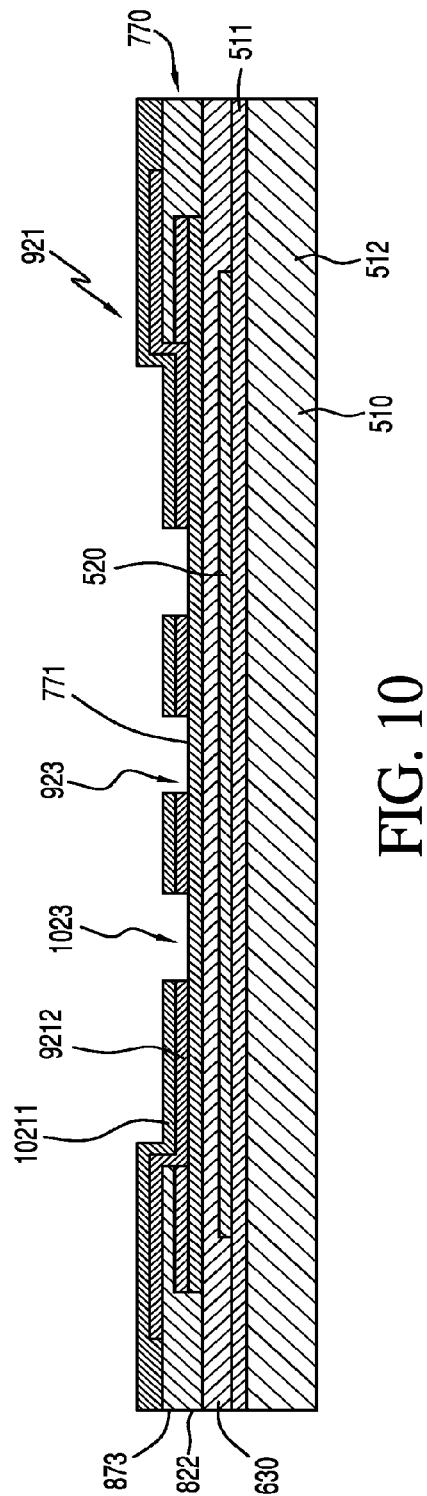
FIG. 9
FIG. 10

DISPLAYS WITH EMBEDDED MEMS SENSORS AND RELATED METHODS

CROSS REFERENCE TO RELATED APPLICATIONS

This application claims priority to International Patent Application PCT/US2009/068523, titled "Displays With Embedded MEMS Sensors And Related Methods, filed on Dec. 17, 2009, which claims priority to U.S. Patent Application 61/147,683, titled "MEMS Shock Sensor Fabricated on Flexible Substrate," and filed on Jan. 27, 2009, to U.S. Patent Application No. 61/174,438, titled "Embedded MEMS Sensors And Related Methods," and filed on Apr. 30, 2009; and to U.S. Patent Application 61/222,451, titled "Displays With Embedded MEMS Sensors And Related Methods," and filed on Jul. 1, 2009. The disclosure of the applications referenced above are incorporated herein by reference.

GOVERNMENT FUNDING

At least part of the disclosure herein was funded with government support under grant/contract number W911NF-04-2-0005, awarded by the Army Research Laboratory (ARL). The United States Government may have certain rights in this application.

TECHNICAL FIELD

The disclosure herein relates generally to semiconductor devices and methods of providing semiconductor devices, and relates, more particularly, to semiconductor devices for displays with embedded MEMS (Micro Electro Mechanical System) sensors and related methods.

BACKGROUND

In recent years, electronic display technology has advanced significantly, shifting from cathode-ray based tubes to high resolution displays with arrays of picture elements (pixels) manufactured via semiconductor processes. Touch sensitive overlays have also been developed to couple with such displays to create touch screen displays.

The design and manufacture of such touch screen displays, however, comes at a cost. For example, the manufacturing process becomes more complex and expensive as a result of having to procure, align, and couple the touch sensitive overlays with the displays. In addition, the location of the touch sensitive overlays over the displays reduces the transmission of light through the layers and hence reduces image brightness.

Therefore, a need exists to develop displays with integrated touch sensors to avoid the limitations described above.

BRIEF DESCRIPTION OF THE DRAWINGS

The invention will be better understood from a reading of the following detailed description of examples of embodiments, taken in conjunction with the accompanying figures in the drawings in which:

FIG. 5 illustrates a cross-sectional view of a portion of a MEMS device comprising a flexible substrate and a first plate in accordance with the method of FIG. 4.

FIG. 6 illustrates a cross-sectional view of a portion of the MEMS device of FIG. 5 further comprising a first dielectric.

FIG. 9 illustrates a cross-sectional view of a portion of the MEMS device of FIG. 8 after a first part of the formation of a sensor membrane.

FIG. 10 illustrates a cross-sectional view of a portion of the MEMS device of FIG. 9 after a second part of the formation of the sensor membrane.

Figure 1:
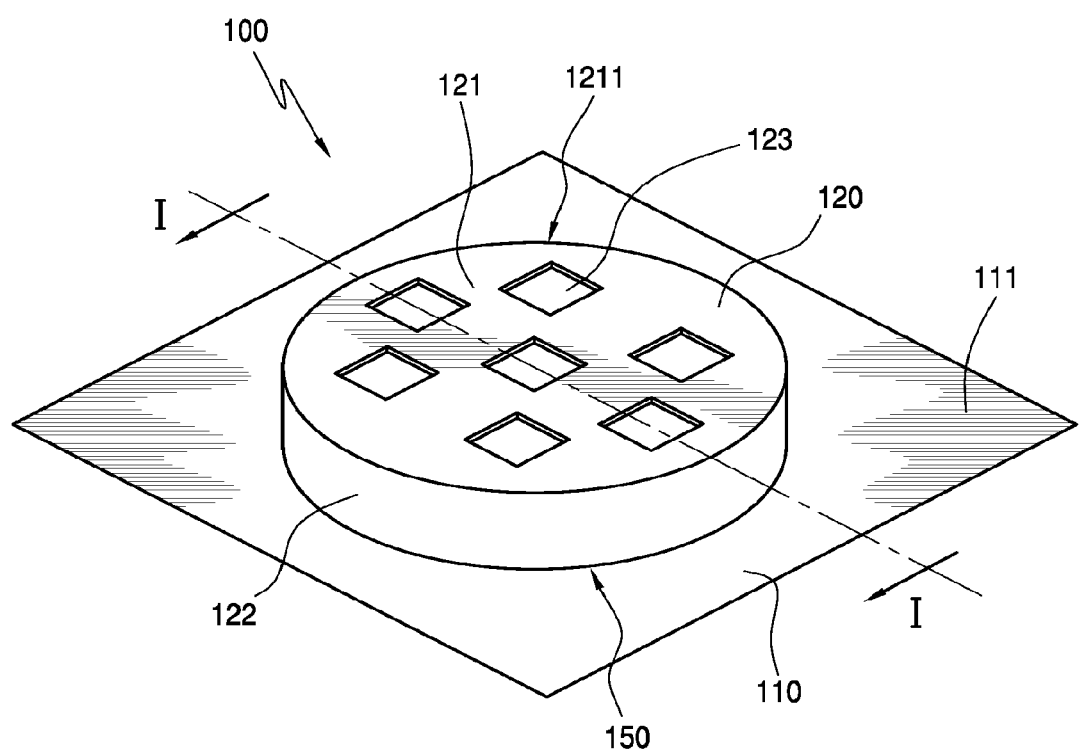
FIG. 1 illustrates a perspective view of a semiconductor device comprising a MEMS device according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In a first embodiment, a semiconductor device comprises a substrate and a MEMS device fabricated over the flexible substrate. In the same or a different embodiment, the semiconductor device can comprise an electronic device fabricated over the substrate and electrically coupled to the MEMS device. In the same and other embodiments, the MEMS device can comprise an electrically conductive material located over the flexible substrate, a sensor membrane movably suspended over the electrically conductive material, and a first dielectric located over the electrically conductive material and under the sensor membrane.

In a second embodiment, a method for providing a semiconductor device can comprise providing a substrate and forming a MEMS device over the substrate. Forming the MEMS device can comprise providing an electrically conductive layer over the substrate, providing a first dielectric over the electrically conductive layer, providing a sacrificial structure over the first dielectric, and providing a sensor membrane over the sacrificial structure.

In a third embodiment, a semiconductor device can comprise a substrate, one or more MEMS devices over the substrate, and a pixel array over the substrate, the pixel array comprising one or more pixels. In the same or other embodiments, the one or more MEMS devices are formed over the substrate simultaneously along with the pixel array.

In a fourth embodiment, a method can comprise providing a substrate, forming a pixel array over the substrate, and forming a MEMS array over the substrate, where the pixel array can comprise one or more pixels and the MEMS array can comprise one or more MEMS devices. In some examples, forming the MEMS array over the substrate comprises forming at least a first MEMS device of the one or more MEMS devices to be pressure sensitive, and interspersing the MEMS array with the pixel array over the substrate. Other embodiments are described and claimed herein.

Figure 2:
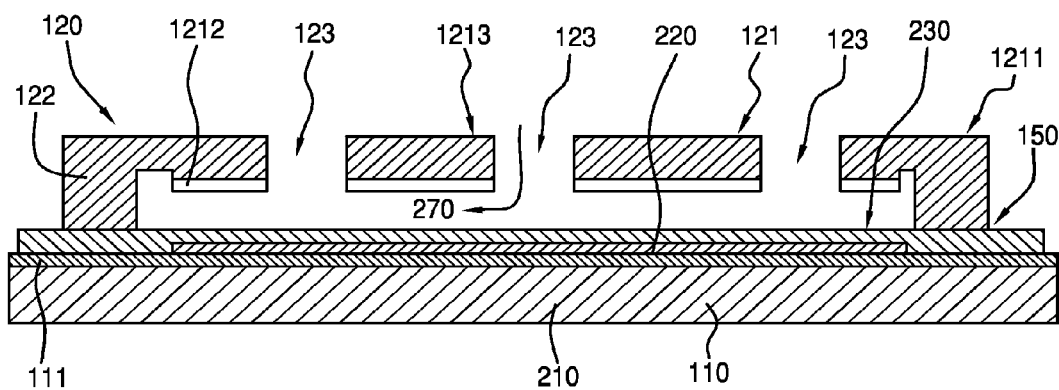
FIG. 2 illustrates a cross-sectional view along a line 1-1 of the semiconductor device of FIG. 1.

Turning to the drawings, FIG. 1 illustrates a perspective view of semiconductor device 100 comprising MEMS device 120 in accordance with an embodiment of the present disclosure. FIG. 2 illustrates a cross-sectional view along a line I-I of MEMS device 120 of FIG. 1. MEMS device 120 is merely exemplary and is not limited to the embodiments presented herein.

In the example of FIGS. 1-2, semiconductor device 100 comprises MEMS device 120 integrally fabricated over substrate 110. In the same and other examples, substrate 110 (or substrate body 210) can be a plastic substrate, and/or can comprise at least one of a flexible polyethylene naphthalate (PEN) material, such as that available from Teijin DuPont Films of Tokyo, Japan, under the tradename planarized "Teonex® Q65," a polyethylene terephthalate (PET) material, a polyethersulfone (PES) material, a polyimide, a polycarbonate, a cyclic olefin copolymer, and/or a liquid crystal polymer. In other examples, substrate 110 can comprise other materials such as a stainless steel material, a silicon material, an iron nickel (FeNi) alloy material (e.g., FeNi, FeNi36, or Inver™; where Inver™ comprises an alloy of iron (64 percent (%)) and nickel (36%) (by weight) with some carbon and chromium), an iron nickel cobalt (FeNiCo) alloy material (e.g., Kovar™, where Kovar™ typically comprises 29% nickel, 17% cobalt, 0.2% silicon, 0.3% manganese, and 53.5% iron (by weight)), a titanium material, a tantalum material, a molybdenum material, an aluchrome material, and/or an aluminum material. In another embodiment, substrate 110 can be rigid and can comprise a semiconductor material such as silicon.

As seen in FIG. 2, semiconductor substrate 110 comprises planarization layer 111 between substrate body 210 of substrate 110 and MEMS device 120 in the present example. In some examples, planarization layer 111 can comprise a dielectric passivation material, such as silicon nitride, over substrate body 210.

As illustrated in FIGS. 1-2, MEMS device 120 can be fabricated directly on substrate 110, and can comprise electrically conductive material 220 located over substrate 110, dielectric 230 located over electrically conductive material 220, and sensor membrane 121 suspended over dielectric 230. Electrically conductive material 220 comprises a metallic layer in the present example, and can comprise a metallic material such as molybdenum, tantalum, aluminum, tungsten, and/or gold in at least some embodiments. There can be some embodiments where electrically conductive material 220 can be referred to as a plate. Dielectric 230 comprises a dielectric layer in the present example, and can comprise materials such as silicon nitride, silicon dioxide ($SiO_2$), and/or polyimide, in at least some embodiments.

In the present embodiment, membrane perimeter 1211 of sensor membrane 121 is supported by wall structure 122 over dielectric 230. Wall structure 122 comprises one or more dielectric layers deposited over dielectric 230 along sensor perimeter 150 of MEMS device 120 in the present example, and can comprise a silicon nitride material in at least some embodiments. As seen in FIG. 1, sensor perimeter 150 comprises a round or circular shape, and membrane perimeter 1211 of sensor membrane 121 is also correspondingly round or circular. In the same or a different embodiment, sensor perimeter 150 and/or membrane perimeter 1211 can comprise a radius of approximately 50 micrometers to approximately 250 micrometers. In the example of FIGS. 1-2, sensor membrane 121 comprises a radius of approximately 70 micrometers. Another example can comprise a sensor membrane with a radius of approximately 200 micrometers. There can also be other embodiments where at least one of sensor perimeter 150 and/or membrane perimeter 1211 can comprise non-circular shapes, such as oval or square shapes. With a circular shape, however, MEMS device 120 can be more stable without needing a central support, as shown in FIG. 2. Wall structure 122 also defines sacrificial compartment 270 between: (1) sensor membrane 121; and (2) dielectric 230 and/or electrically conductive material 220. In the present example, sacrificial compartment 270 comprises an air gap.

As shown in FIGS. 1-2, sensor membrane 121 comprises one or more openings 123 leading to sacrificial compartment 270. In the present embodiment, MEMS device 120 comprises 7 openings 123 in sensor membrane 121, although other embodiments can comprise a different number of openings. For example, some implementations can comprise approximately 5 to 20 openings leading to the sacrificial compartment. In the present example, one or more of openings 123 of sensor membrane 121 can be a square measuring approximately 12 micrometers by approximately 12 micrometers. In other examples where the sensor membrane comprises approximately 10 to 150 openings, one or more of such openings can measure approximately 10-20 micrometers by approximately 10-20 micrometers. There can be further examples with openings comprising non-square (e.g., round, triangular, etc.) perimeters, but otherwise can be similar to openings 123. In the present and other embodiments, openings 123 can be employed during the formation of sacrificial compartment 270. The formation of sacrificial compartment 270 will be further described below.

Sensor membrane 121 also comprises electrically conductive material 1212 facing dielectric 230 in the present example, where electrically conductive material 1212 can comprise a metallic material such as molybdenum, aluminum, tantalum, tungsten, and/or gold. In the same or other examples, a layer of doped amorphous silicon can also comprise part of electrically conductive material 1212 or be located adjacent thereto.

As seen in FIG. 2, electrically conductive material 1212 couples to support layer 1213 of sensor membrane 121, where support layer 1213 can be deposited over electrically conductive material 1212 during fabrication. In the present embodiment, perimeter 1211 of sensor membrane 121 comprises a perimeter of support layer 1213, and the perimeter of support layer 1213 anchors sensor membrane 121 to wall structure 122 past a perimeter of electrically conductive material 1212. In some examples, support layer 1213 can comprise a silicon nitride material, a silicon oxynitride ($SiO_xN_y$) material, a silicon dioxide ($SiO_2$) material, a passivation material, a siloxane-based material, an organosiloxane material, an organic siloxane-based material, and/or another dielectric material. In the same or other examples, support layer 1213 can comprise a PTS material such as that available from Honeywell International, Inc. of Morristown, N.J., under the name PTS-R.

In the same or a different example, support layer 1213 can comprise a thickness of approximately 2 micrometers to approximately 2.5 micrometers. In the same or a different example, MEMS device 120 can comprise a height of approximately 2.5 micrometers to approximately 3.5 micrometers over substrate 110.

In the present embodiment MEMS device 120 comprises a shock or pressure sensor, and is configured to sense variations in pressure by detecting changes in capacitance between sensor membrane 121 and electrically conductive material 220. In the same and other embodiments, electrically conductive material 220 and electrically conductive material 1212 of sensor membrane 121 can be considered as the plates of a capacitor, where the capacitance between the plates changes as sensor membrane 121 moves or deforms, at least temporarily, relative to electrically conductive material 220 as a result of the variations in pressure. In the same or other embodiments, when subject to shock waves and/or pressure changes, sensor membrane 121 can move or deform enough to move toward and/or make contact with dielectric 230 over electrically conductive material 220. In some embodiments, when in a steady state not subject to pressure variations, MEMS device 120 can comprise a capacitance of approximately 1.5 picofarads and approximately 8.0 picofarads. In the same or different embodiments, MEMS device 120 can comprise a capacitance of approximately 1.89 picofarads to approximately 7.8 picofarads. There can be embodiments where MEMS device 120 can sense pressure changes or shocks of approximately 15 kilopascals (kPa) to approximately 60 kPa. For example, where sensor membranes 121 comprises a radius of 70 micrometers, MEMs device 120 may be configured to sense pressure changes of approximately 50 kPa. In other examples with sensor membranes comprising a radius of 200 micrometers, pressure changes of approximately 20 kPa may be sensed.

Figure 3:
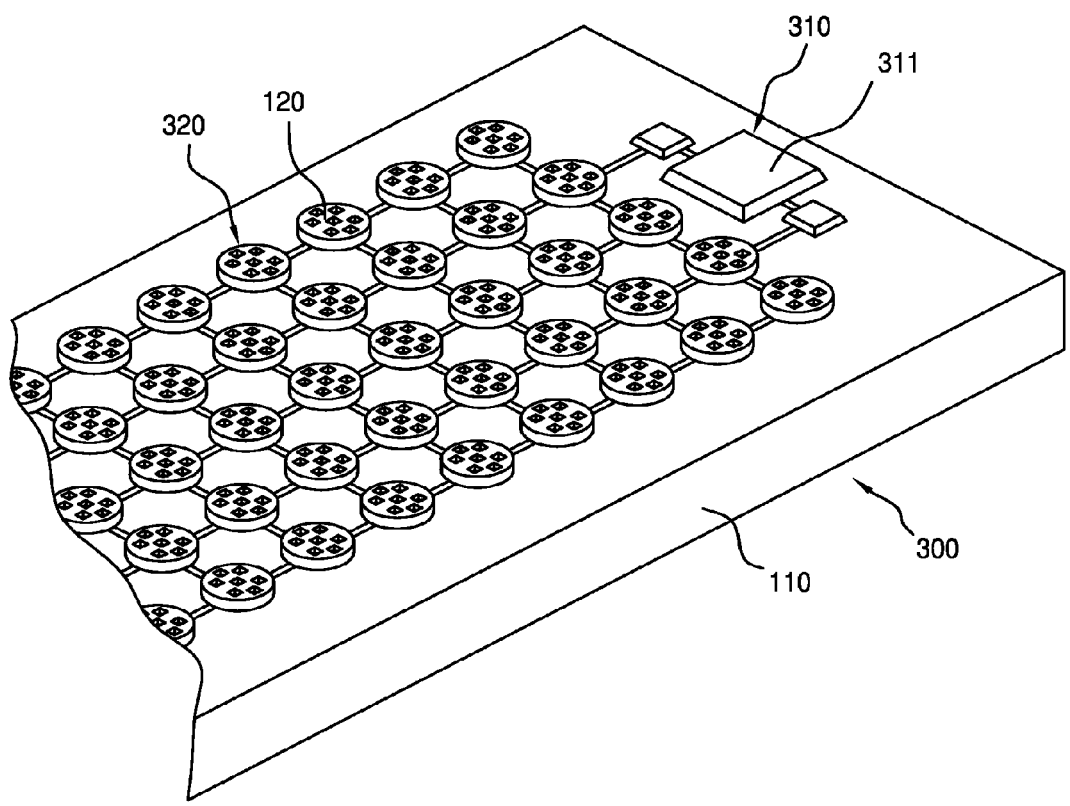
FIG. 3 illustrates a perspective view of a semiconductor device comprising a MEMS array having the MEMS device of FIGS. 1-2.

FIG. 3 illustrates a perspective view of semiconductor device 300 comprising MEMS array 320. In the embodiment of FIG. 3, MEMS array 320 comprises one or more MEMS sensors coupled together, including MEMS device 120 of FIGS. 1-2 as fabricated over substrate 110. Although the MEMS sensors of array 320 comprise the same diameter in the present examples, there can be examples where the MEMS array can comprise one or more MEMS sensors with a first diameter and one or more MEMS sensors with a different diameter and/or a different shape. In the present and other embodiments, semiconductor device 100 can comprise one or more electronic devices fabricated over substrate 110 different than MEMS device 120. For example, as shown in FIG. 3, one or more electronic devices 310, such as electronic device 311, can also be fabricated over substrate 110 and electrically coupled to MEMS device 120.

In the same or a different embodiment, MEMS device 120 and the other MEMS sensors of MEMS array 320 can be fabricated simultaneously over substrate 110 with electronic devices 310 using the same semiconductor process flow, or a modification of the semiconductor process flow, used for electronic devices 310, or vice versa. For example, electronic device 311 can comprise at least one transistor (not shown), and electrically conductive material 220 of MEMS device 120 (FIG. 2) can comprise a gate material used for a gate electrode of the at least one transistor of electronic device 311. In the same or a different example, dielectric 230 of MEMS device 120 (FIG. 2) can comprise a gate dielectric material used for a gate dielectric of the at least one transistor of electronic device 311.

Semiconductor device 300 can be implemented as a shock sensor and/or to detect pressure variations, and in the present and other examples, two or more of the MEMS sensors of MEMS array 320 can be coupled together in parallel to enhance the sensitivity of semiconductor device 300. The parallel coupling of the MEMS sensors of MEMS array 320 can increase the total capacitance of semiconductor device 300 and can help to minimize false readings by adding a level of redundancy to semiconductor device 300. In the same or other examples, such an arrangement can help to overcome false positives caused by random and/or faulty MEMs sensors.

In the present example, electronic device 311 represents a capacitance measurement circuit configured to measure and/or process the shock or pressure variations detected by MEMS array 310. In the same or a different example, semiconductor device 300 can comprise other electronic devices 310 such as display circuits (not shown) integrally fabricated over substrate 110. In such embodiments, the display circuits can comprise display elements such as pixels (picture elements) of a display, and can be electrically coupled to MEMS array 320 and/or to the capacitance measurement circuit of electronic device 311.

In the present and other implementations, semiconductor device 300 can integrate MEMS array 320 and other electronic devices 310 onto a single flexible substrate suitable for sensing and/or measuring shock or pressure variations, processing information out of the measurements, and displaying the information on the single flexible substrate. In the same or different embodiments, semiconductor device 300 can be configured to process blast dosimetry information measured at least partially via MEMS device 120 and/or to keep record of, for example, a number and/or magnitude of nearby explosions or shockwaves that a soldier has been exposed to during a period of time. In such examples, semiconductor device 300 can be attached to the soldier's gear and/or to the body of the soldier at predetermined locations, including locations expected to be exposed to peak shockwaves. As an example, semiconductor device 300 can be attached to a helmet and/or near the top back of the skull of the soldier. In the same or other examples, semiconductor device 300 can be attached with or as an adhesive bandage.

Figure 4:
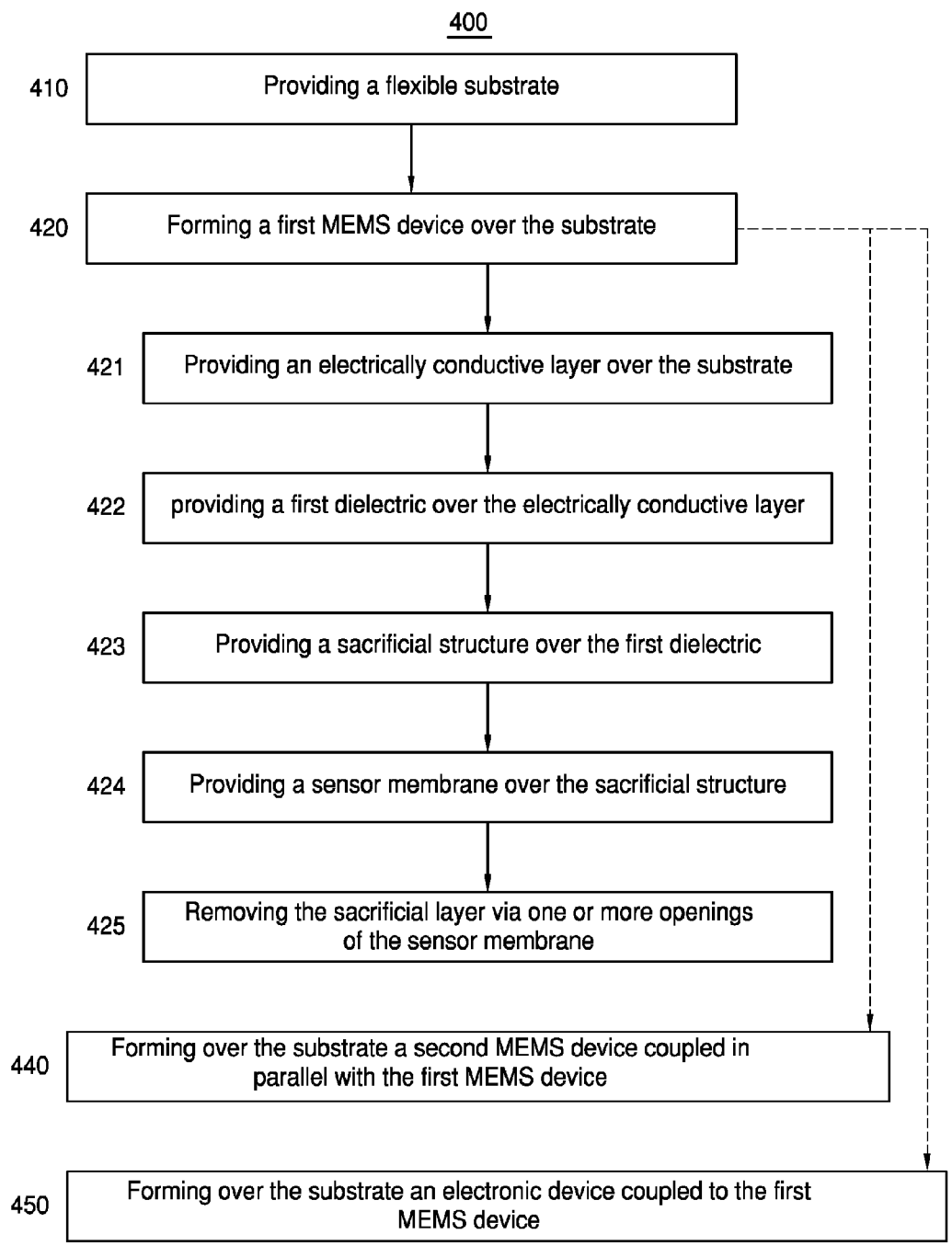
FIG. 4 illustrates a flowchart for a method for providing a semiconductor device.

Moving along, FIG. 4 illustrates a flowchart for a method 400 that can be used for providing a semiconductor device. In the same or different embodiments, method 400 can be considered a method of manufacturing a MEMS device, such as MEMS device 120 (FIGS. 1-3), over a flexible substrate. Method 400 is merely exemplary and is not limited to the embodiments presented herein. Method 400 can be employed in many different embodiments or examples not specifically depicted or described herein.

Method 400 includes a procedure 410 of providing a substrate. FIG. 5 illustrates a cross-sectional view of a portion of MEMS device 500 comprising substrate 510, where substrate 510 can be similar to the substrate of procedure 410 and/or to substrate 110 (FIGS. 1-2) in some embodiments. In the same or different embodiments, procedure 410 of method 400 can include providing a flexible substrate. In many examples, the flexible substrate can be a plastic substrate. For example, in the embodiment of FIG. 5, body 512 of substrate 510 can be similar to substrate body 210 in FIG. 2, and can comprise a flexible polyethylene naphthalate (PEN) material, such as that available from Teijin DuPont Films of Tokyo, Japan, sold under the tradename planarized "Teonex® Q65." In other embodiments, the substrate of procedure 410 can comprise a flexible substrate comprising polyethylene terephthalate (PET), polyethersulfone (PES), polyimide, polycarbonate, cyclic olefin copolymer, and/or liquid crystal polymer. The thickness of the substrate of method 400 can be in the range of approximately 25 micrometers to approximately 300 micrometers in some embodiments. In the same or different embodiments, the thickness of the substrate can be in the range of approximately 100 micrometers to approximately 200 micrometers.

In some examples, procedure 410 can further comprise providing a planarized surface over the substrate. In the example of FIG. 5, the planarized surface of procedure 410 can be formed by planarization layer 511, where layer 511 can comprise a passivation layer at the top of substrate 510. In some embodiments, planarization layer 511 can comprise a dielectric material such as silicon nitride, and can have a thickness of approximately 3000 Angstroms. Layer 511 can be similar to planarization layer 111 in FIG. 2.

In a different example, procedure 410 can include providing a stainless steel flexible substrate. In still further examples, the substrate of procedure 410 can include silicon, iron nickel (FeNi) alloys (e.g., FeNi, FeNi36, or Inver™; where Inver™ comprises an alloy of iron (64%) and nickel (36%) (by weight) with some carbon and chromium), iron nickel cobalt (FeNiCo) alloys (e.g., Kovar™, where Kovar™ typically comprises 29% nickel, 17% cobalt, 0.2% silicon, 0.3% manganese, and 53.5% iron (by weight)), titanium, tantalum, molybdenum, aluchrome, and/or aluminum.

In the same or different embodiments, the substrate of procedure 410 can be coupled to a carrier (not shown) to provide rigidity and/or to support the substrate. In various embodiments, the carrier includes at least one of the following: alumina ($Al_2O_3$), silicon, glass, steel, sapphire, barium borosilicate, soda lime silicate, alkalai silicates, or other materials. The carrier can be coupled to the substrate using an adhesive or by other means. For example, the carrier could comprise sapphire with a thickness approximately 0.7 millimeters (mm) to approximately 1.1 mm. The carrier could also comprise 96% alumina with a thickness approximately 0.7 mm to approximately 1.1 mm. In a different embodiment, the thickness of the 96% alumina can be approximately 2.0 mm. In another example, the carrier could comprise single crystal silicon with a thickness of at least approximately 0.65 mm. In some examples, the carrier is slightly larger than the substrate.

The substrate of procedure 410 can be cleaned in some examples to remove any particles on the substrate. In some embodiments, the substrate can be cleaned to remove any adhesives on the substrate. For example, if the substrate is stainless steel, the substrate can be washed with hexanes for approximately twenty seconds while spinning at approximately 1,000 rpm (revolutions per minute). In some examples, the edge of the substrate can be sprayed with hexanes for the last ten seconds. Afterwards, the substrate can be spun at approximately 3,000 rpm for approximately twenty seconds to dry the substrate. In some examples, the substrate can be baked for approximately sixty seconds at approximately 105 degrees Celsius (° C.) to further dry the substrate.

To remove large particles from the substrate, the substrate of procedure 410 can be scrubbed. For example, if the substrate is stainless steel, the substrate can be scrubbed with soap and water (e.g., 40 milliliters (mL) of Alconox Detergent 8 mixed with one liter of water) using a sponge. Alconox Detergent 8 is manufactured by Alconox, Inc. of White Plains, N.Y. Organics can also be removed from the substrate by ashing in some examples. For example, if the substrate is stainless steel, the substrate can be ashed for approximately ninety minutes in an oxygen ($O_2$) environment at a pressure of approximately 1,200 milliTorr.

Continuing with method 400, procedure 420 comprises forming a first MEMS device over the substrate of procedure 410. In some embodiments, the first MEMS device of procedure 420 can be similar to MEMS device 120 from FIGS. 1-3). In the same or different embodiments, procedure 420 can comprise several subparts such as such as procedures 421-425.

In the present example of FIG. 4, procedure 421 comprises providing an electrically conductive layer over the substrate of procedure 410. In some embodiments, the electrically conductive layer can be referred to as a gate layer or as a first plate. In the same or other embodiments, the electrically conductive layer of procedure 421 can be similar to plate 520 of MEMS device 500 in FIG. 5. In turn, plate 520 can be similar to electrically conductive material 220 of semiconductor device 100 (FIG. 2). In the same or a different embodiments, plate 520 can be deposited over substrate 510 and then patterned to a desired form.

Procedure 422 of method 400 comprises providing a first dielectric over the electrically conductive layer of procedure 421. FIG. 6 illustrates a cross-sectional view of a portion of MEMS device 500 comprising dielectric 630, where dielectric 630 can be similar to the first dielectric of procedure 420 and/or to dielectric 230 (FIG. 2) in some embodiments. Dielectric 630 is deposited over planarization layer 511 of substrate 510 in the present example to a thickness of approximately 3000 Angstroms.

Figure 7:
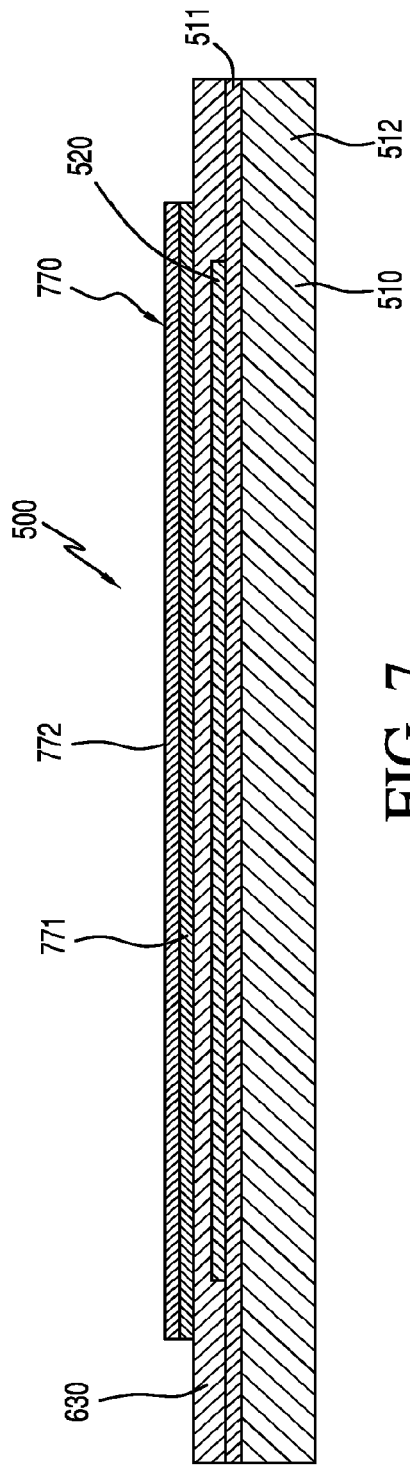
FIG. 7 illustrates a cross-sectional view of a portion of the MEMS device of FIG. 6 after a first part of the formation of a sacrificial structure.
Figure 8:
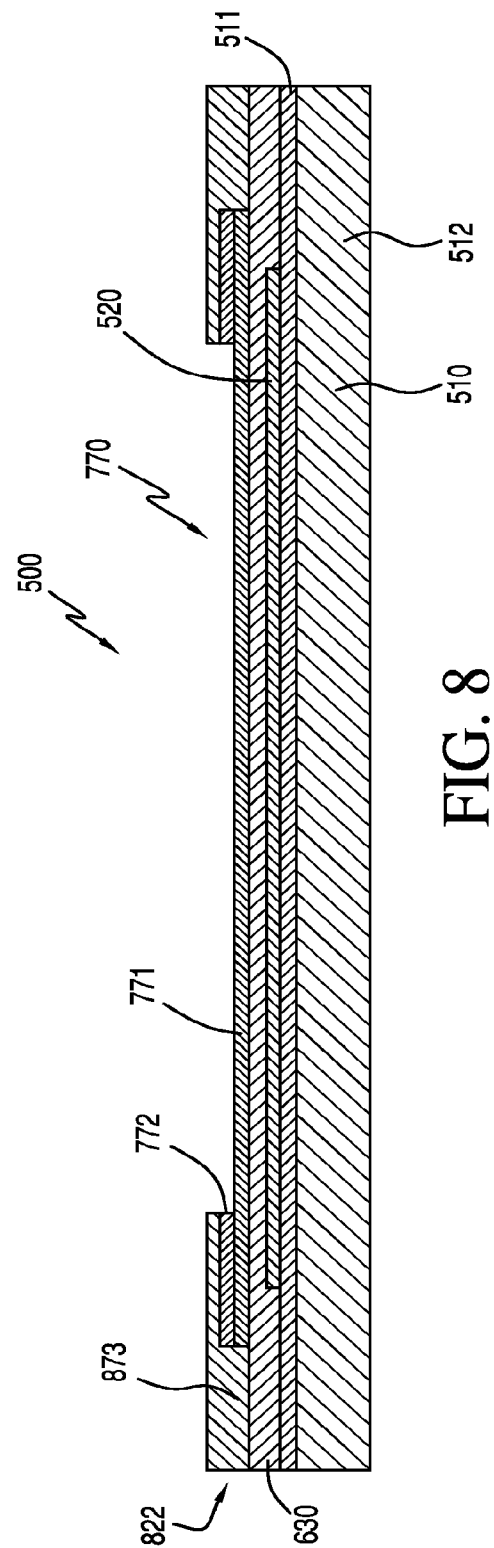
FIG. 8 illustrates a cross-sectional view of a portion of the MEMS device of FIG. 7 after a second part of the formation of the sacrificial structure.

Procedure 423 of method 400 comprises providing a sacrificial structure over the first dielectric of procedure 422. In some examples, the sacrificial structure can be used to form sacrificial compartment 270 (FIG. 2) described for MEMS device 120 above. In the same or a different example, the sacrificial structure can be similar to sacrificial structure 770 as described in FIGS. 7-8. FIG. 7 illustrates a cross-sectional view of a portion of MEMS device 500 after a first part of the formation of sacrificial structure 770. FIG. 8 illustrates a cross-sectional view of a portion of MEMS device 500 after a second part of the formation of sacrificial structure 770.

In the present example of method 400, part of procedure 423 comprises providing a sacrificial layer over the first dielectric of procedure 422. In the example of FIG. 7, sacrificial layer 771 deposited over dielectric 630 can be similar to the sacrificial layer of procedure 423 of method 400. In some examples, sacrificial layer 771 can comprise an amorphous silicon channel material. In the same or other examples, the sacrificial layer can be deposited over dielectric 630 to a thickness of approximately 0.08 micrometers. In the present example, sacrificial structure 770 also comprises dielectric layer 772 deposited over sacrificial layer 771, where dielectric layer 772 can comprise a patterned silicon nitride intermetal dielectric (IMD) layer having a thickness of approximately 0.10 micrometers in some examples. In other embodiments, sacrificial structure 700 can comprise a single layer.

In the present example, part of procedure 423 of method 400 can also comprise providing a compartment wall at a perimeter of the sacrificial layer and over the first dielectric, where the compartment wall for procedure 423 can be similar to wall structure 122 of semiconductor device 100 (FIGS. 1-2). In the same or different examples, now referring to FIG. 8, compartment wall 822 can correspond to the compartment wall for procedure 423 as formed by dielectric layer 873. In the present example, dielectric layer 873 comprises a patterned approximately 0.10 micrometer thick silicon nitride layer. In the same or other examples, dielectric layer 873 can comprise a passivation material. There can also be other examples where dielectric layer 873 can comprise other dielectric materials and/or IMD layer.

As seen in FIG. 8, compartment wall 822 can be formed by providing one or more dielectric layers, such as dielectric layers 772 and 873, over sacrificial layer 771. In other examples, dielectric layer 772 can be omitted from compartment wall 822 such that compartment wall 822 would only comprise a single dielectric layer comprising the space occupied by dielectric layers 772 and 873 in FIG. 8. A perimeter of dielectric layer 873 contacts dielectric 630 in the present example past a perimeter of sacrificial layer 771 and dielectric layer 772. As a result, compartment wall 822 bounds the perimeter of sacrificial layer 771 and dielectric layer 772 in the present example.

Once placed over sacrificial layer 771, the one or more dielectric layers described above can be patterned to remove portions thereof over sacrificial layer 771 and thereby further define compartment wall 822. For example, FIG. 8 presents dielectric layers 873 and 772 after being etched to expose at least part of sacrificial layer 771.

Figure 11:
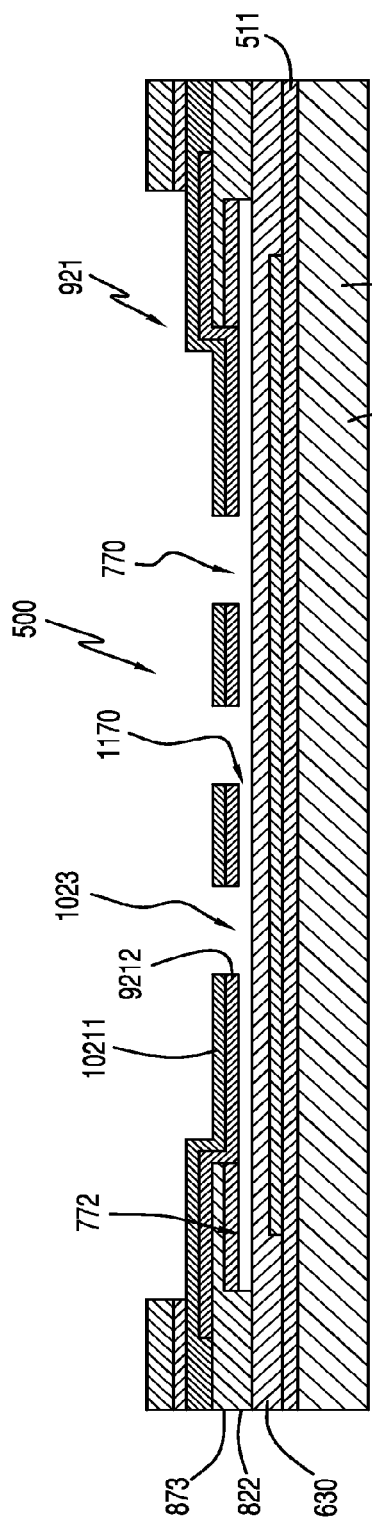
FIG. 11 illustrates a cross-sectional view of a portion of the MEMS device of FIG. 10 after removal of the sacrificial layer.

Continuing with method 400, procedure 424 comprises providing a sensor membrane over the sacrificial structure of procedure 423. In some examples, the sensor membrane of procedure 424 can be similar to sensor membrane 121 of MEMS device 120 (FIGS. 1-2). In the same or different examples, the sensor membrane of procedure 424 and/or sensor membrane 121 can be similar to sensor membrane 921 as illustrated in FIGS. 9-11, and/or can comprise a substantially circular perimeter.

In the present example, part of procedure 424 comprises providing a second electrically conductive layer over the sacrificial structure of procedure 423. FIG. 9 illustrates a cross-sectional view of a portion of MEMS device 500 after a first part of the formation of sensor membrane 921. In the embodiment of FIG. 9, the second electrically conductive layer described for procedure 424 can be similar to plate 9212 of sensor membrane 921 over sacrificial structure 770. In the same or a different embodiment, the second electrically conductive layer of procedure 424 and/or plate 9212 can be similar to electrically conductive material 1212 described above for MEMS device 120 (FIG. 2). In some examples, plate 9212 can have a thickness of approximately 0.20 micrometers. In the same or different examples, plate 9212 can comprise at least one of an aluminum material, a molybdenum material, a tungsten material, a gold material and/or a tantalum material. There may be embodiments where plate 9212 can comprise a stack of more than one material.

As seen in FIG. 9, one or more openings 923 can be etched through plate 9212 to expose one or more portions of sacrificial structure 770 and/or of sacrificial layer 771 in at least some embodiments. Openings 923 can be similar, for example, to openings 123 through membrane 121 of MEMS device 120 as described above for FIGS. 1-2. In the same or different examples, plate 9212 can be etched in one in-situ etching procedure with dielectric layer 873 and/or sacrificial layer 771 acting as etch stop layers. In some examples, plate 9212 can be etched using an AMAT 8330, manufactured by Applied Material, Inc. of Santa Clara, Calif. A perimeter of plate 9212 can extend beyond a perimeter of plate 520, as illustrated in FIG. 9.

Another part of procedure 424 of method 400 can comprise providing a structural layer over the second electrically conductive layer. As an example, FIG. 10 illustrates a cross-sectional view of a portion of MEMS device 500 after a second part of the formation of sensor membrane 921. In the embodiment of FIG. 10, the structural layer described for procedure 424 can be similar to structural layer 10211 of sensor membrane 921 over plate 9212. In the same or a different embodiment, the structural layer of procedure 424 and/or structural layer 10211 can be similar to support layer 1213 described above for MEMS device 120 (FIG. 2), and can comprise similar materials. There may be embodiments where structural layer 10211 can comprise a stack of more than one material. In the present example of FIG. 10, a perimeter of structural layer 10211 is shown coupled with a perimeter of sacrificial structure 770 past a perimeter of plate 9212. As a result, the perimeter of structural layer 10211 contacts dielectric layer 873 at the perimeter of compartment wall 822 and bounds the perimeter of plate 9212 in the present example. As seen in FIG. 10, one or more openings 1023 can be etched through structural layer 10211 to expose one or more portions of sacrificial structure 770 and/or of sacrificial layer 771 in at least some embodiments. Openings 1023 can be similar to, and substantially aligned with, openings 923 as etched through plate 9212, and can also be similar to openings 123 through membrane 121 of MEMS device 120 as described above for FIGS. 1-2. In some examples, openings 1023 can be plasma etched. In the same of different embodiments, openings 1023 can be etched with a fluorine-based etchant. In some examples, the etchant can be trifluoromethane ($CHF_3$), sulfur hexafluoride ($SF_6$), or other fluorine-based etchants. In some embodiments, openings 1023 can be formed before openings 923, and after forming openings 1023, the remainder of structural layer 10211 can be used as a self-aligned etch mask for openings 923.

There can be examples, including those where the substrate of procedure 410 comprises a plastic substrate, where the different procedures of method 400 to form the first MEMS device are carried out at temperatures not exceeding approximately 190 degrees Celsius. In such examples, the low temperature at which the MEMS device of procedure 420 is fabricated can assist in preventing heat-related damage to the substrate of procedure 410 and/or to elements of the MEMS device of procedure 420.

Continuing with method 400, procedure 425 comprises removing the sacrificial layer described above for procedure 423 via one or more openings of the sensor membrane of procedure 424. In some examples, a sacrificial compartment similar to sacrificial compartment 270 of MEMS device 120 (FIG. 2) remains between the sensor membrane of procedure 424 and the first dielectric of procedure 422 after the sacrificial layer is removed in procedure 425. FIG. 11 illustrates a cross-sectional view of a portion of MEMS device 500 after removal of sacrificial layer 771 from sacrificial compartment 1170 between sensor membrane 921 and dielectric 630 in accordance with an implementation of procedure 425 of method 400. In the example of FIG. 11, sacrificial layer 771 has been removed via etching through openings 1023 of sensor membrane 921 to release sensor membrane 921. In some examples, the etching through openings 1023 can be performed using a dry etch process. In the same or a different example, the etching through openings 1023 can comprise the use of a xenon difluoride ($XeF_2$) reactant or another gaseous reactant. The use of a dry etchant eliminates the problem of stiction when a wet etchant is used. In the same or a different example, the reactant used for etching sacrificial layer 771 comprises enough selectivity to etch only at sacrificial layer 771 without etching or at least without substantially etching sacrificial structure 770 or any other element bounding sacrificial compartment 1170, including plate 9212, dielectric 630, compartment wall 822, dielectric layer 873, structural layer 10211, or dielectric layer 772. In the same or a different example, no separate masking is needed prior to carrying out the etch of sacrificial layer 771.

In some examples, method 400 can comprise procedure 440, comprising forming over the substrate a second MEMS device electrically coupled in parallel with the first MEMS device of procedure 420. In some examples, the second MEMS device can be similar to the first MEMS device and/or can be manufactured using the same semiconductor process flow. In the same or a different example, the first and second MEMS devices of method 400 can be coupled together as described above with respect to FIG. 3 for the MEMS sensors of MEMS array 320. In the same or a different example, the second MEMS device of procedure 440 can comprise a sensor membrane with a diameter and/or a perimeter different than a diameter and/or a perimeter of the sensor membrane provided in procedure 424 for the first MEMS device of procedure 420.

There can be some examples where method 400 also can comprise procedure 450, comprising forming over the substrate an electronic device electrically coupled to the MEMS device of procedure 420. In the same or a different example, the electronic device can be similar to one of electronic devices 310 described above for FIG. 3, and/or could comprise at least part of a display element and/or a capacitance measurement circuit.

Figure 12:
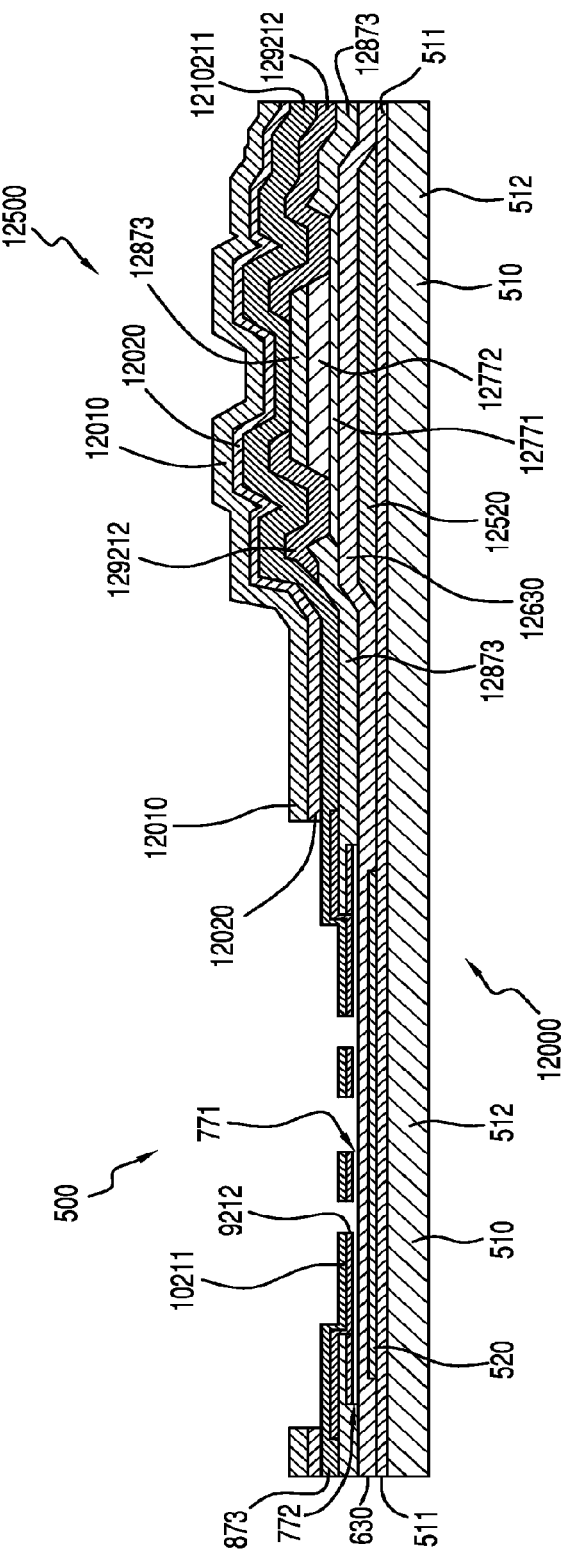
FIG. 12 illustrates a cross-sectional view of a semiconductor device comprising both the MEMS device of FIG. 11 and an electronic device fabricated over the same flexible substrate.

In some embodiments, method 400 can be implemented such that the MEMS device of procedure 420 is fabricated pursuant to a semiconductor process flow for the electronic device of procedure 450 over the flexible substrate of procedure 410, or a modification of such semiconductor process flow. As an example, FIG. 12 illustrates a cross-sectional view of semiconductor device 12000 comprising both MEMS device 500 and electronic device 12500 fabricated over flexible substrate 510. In some examples, electronic device 12500 can correspond to at least part of the electronic device of procedure 450. In the same or a different examples, the part of the electronic device comprises a transistor, and in particular, a thin film transistor.

As can be seen in FIG. 12, MEMS device 500 shares substrate 510, including body 512 and planarization layer 511, with electronic device 12500. Other elements of MEMS device 500 can be fabricated with layers used to fabricate corresponding elements of electronic device 12500. For example, plate 520 of MEMS device 500 can be fabricated out of the same layer or electrically conductive material used to fabricate gate electrode 12520 of electronic device 12500. As a result, the electrical conductive material of plate 520 and the gate electrode of electronic device 12500 can be provided simultaneously during the fabrication of semiconductor device 12000.

In similar fashion, dielectric 630 of MEMS device 500 can be fabricated out of the same layer of material used to fabricate gate dielectric 12630 of electronic device 12500. As a result, dielectric 630 and gate dielectric 12630 can be provided simultaneously during fabrication of semiconductor device 12000.

Plate 9212 of sensor membrane 921 if MEMS device 500 can be fabricated out of the same layer or layers of electrically conductive material as source/drain conductive layer 129212 of electronic device 12500. As a result, plate 9212 and source/drain conductive layer 129212 can be provided simultaneously during fabrication of semiconductor device 12000.

Structural layer 10211 of sensor membrane 921 of MEMS device 500 can be fabricated out of the same layer or layers of material used to fabricate planarization layer 1210211 of electronic device 12500. As a result, structural layer 10211 and planarization layer 1210211 can be provided simultaneously during fabrication of semiconductor device 12000.

Other elements of MEMS device 500 can be similarly fabricated based on layers used to fabricate elements of electronic device 12500. For example, although sacrificial layer 771 is already removed from MEMS device 500 in FIG. 12, in accordance with procedure 425 of method 400, sacrificial layer 771 of MEMS device 500 can be fabricated out of the same layer of channel material used to fabricate channel 12771 of electronic device 12500. Similarly, dielectric layer 772 of MEMS device 500 can be fabricated out of the same layer of material used to fabricate IMD layer 12772 of electronic device 12500. Dielectric layer 873 of MEMS device 500 can be fabricated out of the same layer of material used to fabricate passivation layer 12873 of electronic device 12500.

In the example of FIG. 12, layer 12020 is located over planarization layer 1210211 of electronic device 12500, and layer 12010 is located over layer 12020 of electronic device 12500. In some examples, layer 12020 can comprise an indium-tin-oxide material, and/or layer 12010 can comprise silicon nitride or other dielectric material configured to create an overglass protection layer. Although layers 12010 and 12020 are not needed in the present example for MEMS device 500, MEMS device 500 is still compatible with the semiconductor process for electronic device 12500. For example, layers 12010 and 12020 can be formed and patterned over structural layer 10211 before the removal of sacrificial layer 771.

In some examples, one or more of the different procedures of method 400 can be combined into a single step or performed simultaneously, and/or the sequence of such procedures can be changed. For example, procedure 450 could be performed before procedure 440 in some examples. In other examples, the first MEMS device of procedure 420, the second MEMS device of procedure 440, and the electronic device of procedure 450 can be fabricated simultaneously and/or combined into a single step. There can also be examples where method 400 can comprise further or different procedures. As an example, a procedure could be added after procedure 450 to form a second electronic device over the substrate of procedure 410. In such an example, the electronic device of procedure 450 could form part of a capacitance measurement circuit, and the electronic device of procedure 460 could form part of a display circuit for the semiconductor device of method 400. Other variations can be implemented for method 400 without departing from the scope of the present disclosure.

Figure 13:
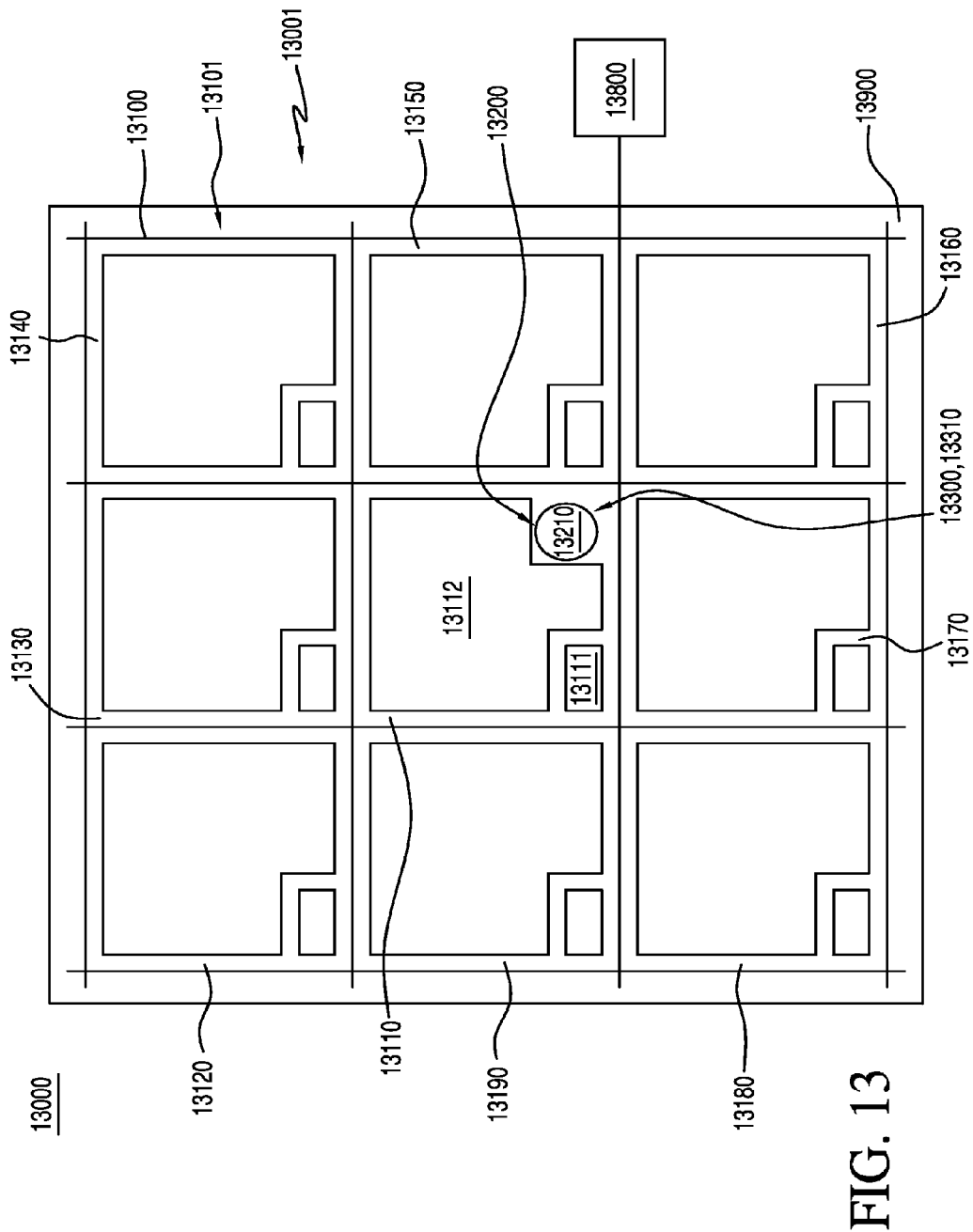
FIG. 13 illustrates a portion of a semiconductor device comprising a first pixel array along with a first MEMS array over a substrate.

Moving along, FIG. 13 illustrates a portion of semiconductor device 13000, comprising pixel array 13100 along with MEMS device 13210 of MEMS array 13200 over substrate 13900. In the present example, semiconductor device 13000 comprises display 13001 defined at least partially by picture elements of pixel array 13100, such as pixel 13110. In the same and other examples, display 13001 of semiconductor device 13000 can be electrophoretic. Display 13001 may also comprise further elements known in the art but not illustrated or described herein, such as a casing or other transparent and/or protective layers located over pixel array 13100.

In the present example, the one or more pixels of pixel array 13100 are located over substrate 13900, where substrate 13900 can be flexible and/or similar to substrate 110 (FIGS. 1-3), the substrate of method 400, or substrate 510 (FIGS. 5-12). Pixel 13110 can be representative of other pixels of pixel array 13100, such as pixels 13120, 13130, 13140, 13150, 13160, 13170, 13180 and 13190. For example, pixel 13110 comprises transistor 13111 coupled to optical layer 13112, where optical layer 13112 is located over an area of pixel 13110 to reflect, emit, and/or transmit light when transistor 13111 is enabled. In the present example, transistor 13111 comprises a thin film transistor. In the same and other examples, transistor 13111 can be similar to electronic device 12500 (FIG. 12), and/or can be fabricated over substrate 13900 in accordance with a semiconductor process flow similar to that described with respect to the electronic device of procedure 450 in method 400 (FIG. 4).

MEMS device 13210 can in some embodiments be similar to MEMS device 120 (FIGS. 1-3), and/or MEMS device 500 (FIGS. 5-12), formed and/or structured such as to be capable of detecting pressure changes. Semiconductor device 13000 comprises in the present embodiment one or more pressure sensors 13300 capable of detecting when a portion of display 13001 is touched, pressed, or otherwise contacted by, for example, a user's finger, glove, stylus, or other interface device. As a result, display 13001 can serve as a touch-screen in some embodiments. In the present example, pressure sensor 13310 of pressure sensors 13300 comprises MEMS device 13210, where pressure sensor 13310 is configured to detect when display 13001 is contacted proximate to MEMS device 13210 and/or pressure sensor 13310.

In some embodiments, MEMS array 13200 can be formed simultaneously with pixel array 13100 over substrate 13900. As an example, in the present embodiment, MEMS device 13210 is similar to MEMS device 500 (FIGS. 5-12), while transistor 13111 is similar to electronic device 12500 (FIG. 12), such that both are fabricated simultaneously over the same substrate throughout a semiconductor process flow, as remarked above for procedure 450 of method 400 (FIG. 4) and/or with respect to FIG. 12. Even if MEMS device 13210 is mechanically coupled to transistor 13111 via substrate 13900, MEMS device 13210 need not be electrically coupled to transistor 13111. The ability to integrate the formation of MEMS array 13200 with that of pixel array 13100 can be beneficial to simplify the manufacture of display 13001 by, for example, dispensing with the need to locate touch-sensitive screens over display 13001 and/or by reducing the amount of light obstructed by such touch-sensitive screens.

Being similar to MEMS device 120 (FIGS. 1-2), MEMS device 13210 of MEMS array 13200 comprises a capacitor having electrically conductive material 220 (FIG. 2) over substrate 13900. MEMS device 13210 also comprise sensor membrane 120 (FIGS. 1-2) suspended over electrically conductive material 220, and configured to move or flex towards the electrically conductive material 220 when display 13001 is contacted proximate to MEMS device 13210 and/or pressure sensor 13310. Sensor membrane 120 in MEMS device 13210 also comprises electrically conductive material 1212 (FIG. 2), and is supported by a wall structure similar to wall structure 122 (FIGS. 1-2) over a gap. In some examples, MEMS device 13210 can also comprise dielectric 230 (FIG. 2) located over electrically conductive material 220. Being movable relative to electrically conductive material 220, sensor membrane 120 can change a capacitance of MEMS device 13210 when thus moved by the contacting of display 13001 proximate to MEMS device 13210. Such change in capacitance can be measured and/or used to detect the contacting of display 13001. In the present example, MEMS device 13210 is sensitive enough that sensor membrane 120 can move relative to electrically conductive material 220 even if display 13001 is not contacted directly over pressure sensor 13310.

In some embodiments, MEMS devices of MEMS array 13200 can comprise an inactive capacitance when sensor membrane 121 is unflexed, and an active capacitance when sensor membrane 121 is flexed towards electrically conductive material 220 (FIG. 2). For example, MEMS device 13210 can comprise an inactive capacitance of approximately 1.9 picofarads, and an active capacitance of approximately 2.4 picofarads. In the same or other embodiments, MEMS device 13210 and/or other individual MEMS devices of MEMS array 13200 can comprise an active capacitance ranging from approximately 2.64 picofarads to approximately 2.16 picofarads, and/or can comprise an inactive capacitance of approximately 2.09 picofarads to approximately 1.71 picofarads. Other capacitance ranges are also possible. For example, there can be embodiments where MEMS device 13210 and/or other individual MEMS devices of MEMS array 13200 can comprise an active capacitance ranging from approximately 2.7 picofarads to approximately 2.1 picofarads, and/or can comprise an inactive capacitance of approximately 2.1 picofarads to approximately 1.7 picofarads. There can also be embodiments where MEMS device 13210 and/or other individual MEMS devices of MEMS array 13200 can comprise an active capacitance ranging from approximately 3.0 picofarads to approximately 2.0 picofarads, and/or can comprise an inactive capacitance of approximately 2.0 picofarads to approximately 1.5 picofarads.

As seen in FIG. 13, pressure sensor 13310 is proximate to pixel set 13101, where pixel set 13101 comprises pixels 13110, 13120, 13130, 13140, 13150, 13160, 13170, 13180, and 13190 of pixel array 13100 in the present example. As a result, pixel set 13101 comprises a plurality of 9 pixels in the present example, where such plurality of pixels lies within a predetermined distance from pressure sensor 13310. In the present example, considering that pressure sensor 13310 is within an area of pixel 13110, the predetermined distance comprises the dimensions of pixels immediately surrounding pixel 13110. In other examples, the predetermined distance may be defined by a radius about pressure sensor 13310. In such examples, each pixel of pixel array 13110 whose centerpoint or other physical characteristic lies within the radius from pressure sensor 13310 could be considered part of pixel set 13101.

Pressure sensor 13310 is also coupled to control module 13800 in the present example, where control module 13800 is configured to correlate pixel set 13101 to pressure sensor 1331. As a result, when pressure sensor 13310 senses a change in capacitance at MEMS device 13110, resulting from user contact to display 13001 proximate to pressure sensor 13310, control module 13800 can identify pixel set 13101 as having been selected by the user. In some examples, control module 13800 can comprise a microcontroller device or circuit, such as an AD7142 and/or an AD7746 controller from Analog Devices, Inc., of Norwood, Mass., USA. There can also be examples where control module 13800 is coupled to and/or fabricated over substrate 110.

Besides the configuration shown in FIG. 13 for pixel set 13101, there may be embodiments having pixel sets of more or less than 9 pixels. For example, there may be embodiments with configurations having anywhere from 1 to 36 pixels per pixel set. Other embodiments may have configurations having greater than 36 pixels per pixel set. The number of pixels per pixel set can be relevant for establishing a sensitivity of display 13001, where having more pressure sensors 13300 per pixels of pixel array 13100, and thereby less pixels per pixel set, may improve the ability of control module 13800 to better identify specific pixels that the user intends to select. There may also be embodiments having pixel sets of different sizes, depending on the desired sensibility for specific display regions. For example, semiconductor device 13000 may comprise a first region with pixel sets comprising a number of pixels, and a second region with pixel sets comprising a different number of pixels. In the same or other embodiments, the number of pixels per pixel set may be determined based on an expected type of interface device. For example, control module 13800 may require a higher number of pixels per pixel set to properly interpret a contacting over display 13001 when the interface device is a stylus than when the interface device is a bulky glove.

In the present example of FIG. 13, MEMS device 13210 is located within pixel 13110, and occupies an area of less than 25% of pixel 13110. The area occupied by MEMS device 13210 in pixel 13110 can be relevant for determining the area available for optical layer 13112 to reflect, emit, and/or transmit light. As a result, the smaller the area occupied by MEMS device 13210, the greater the aperture ratio or fill factor of pixel 13110 can be. In the present or other examples, MEMS device 13210 can comprise a radius of approximately 50 micrometers to approximately 75 micrometers. In the same or other examples, the radius of MEMS device 13210 can be of approximately 60 micrometers, and/or the an area of pixel 13110 can be of approximately 240*240 micrometers squared. In the present and other examples, pixel 13110 comprises an aperture ratio of at least approximately 50%.

Figure 14:
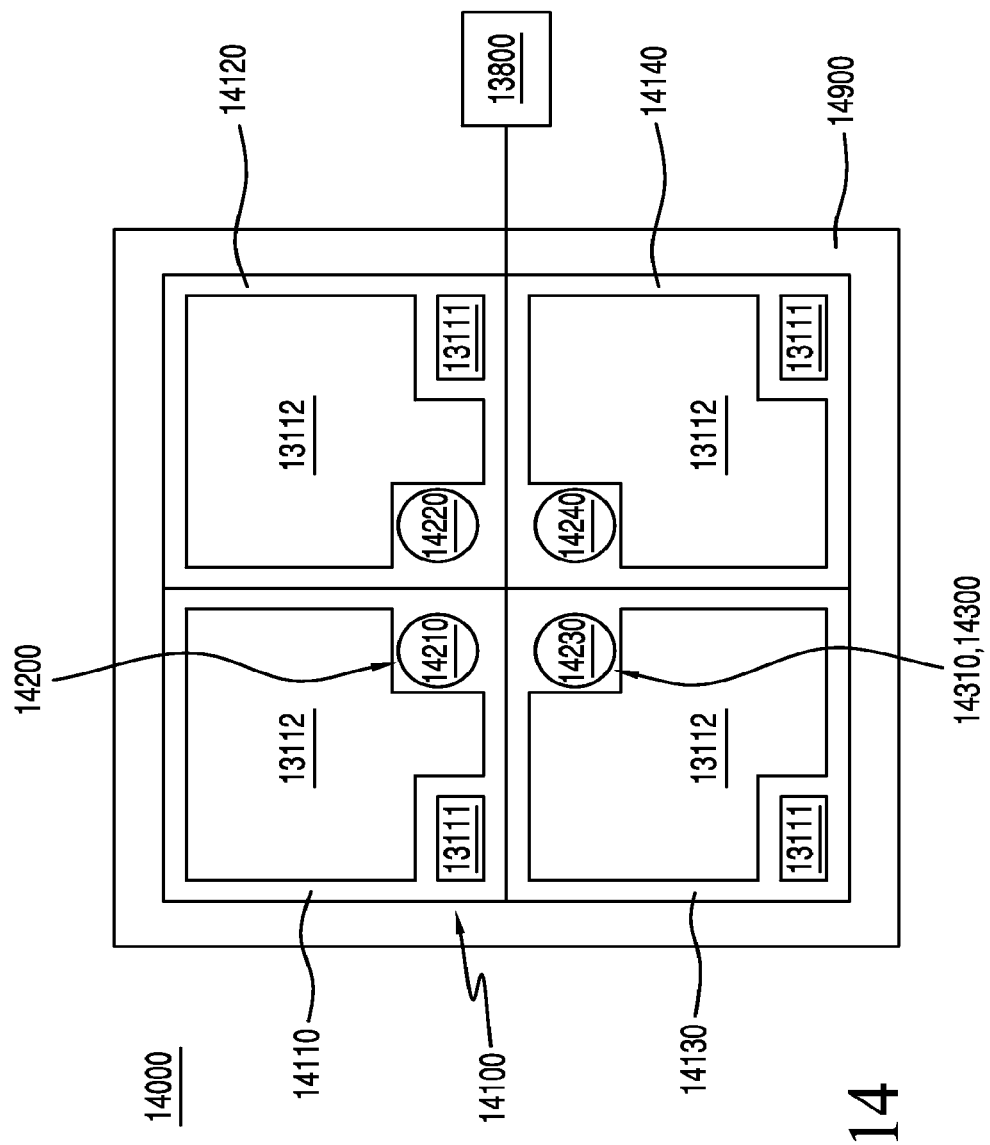
FIG. 14 illustrates a portion of a semiconductor device comprising a second pixel array along with a second MEMS array.

Continuing with the figures, FIG. 14 illustrates a portion of semiconductor device 14000, comprising pixel array 14100 along with MEMS array 14200. Semiconductor device 14000 is similar to semiconductor device 13000 (FIG. 13). For example, substrate 14900 can be similar to substrate 13900 (FIG. 13), pixel 14110 can be similar to pixel 13110 (FIG. 13), and MEMS device 14210 of MEMS array 14200 can be similar to MEMS device 13210 (FIG. 13). Pixels 14120, 14130, and 14140 of pixel array 14100 are also similar to pixel 14110, each comprising a transistor 13111 and their own optical layers 13112 contoured in accordance with physical characteristics of their respective pixels.

Semiconductor device 14000 differs from semiconductor device 13000 in that pressure sensor 14310 of pressure sensors 14300 comprises a plurality of MEMS devices, namely MEMS devices 14210, 14220, 14230, and 14240, whereas pressure sensor 13310 comprised only MEMS device 13210 (FIG. 13). As a result, a sensitivity of pressure sensor 14310 is defined by the combined capacitance of the plurality of its MEMS devices. For example, when control module 13800 monitors pressure sensor 14310, user contact proximate to pressure sensor 14310 may be determined based on a change in capacitance of one or more of the plurality of MEMS devices of pressure sensor 14310. Such a configuration may permit the MEMS devices of MEMS array 14200 to be smaller than the MEMS devices of MEMS array 13200 (FIG. 13), thereby reducing any effect on the aperture ratio and/or fill factor of the pixels of pixel array 14100.

In the present example, MEMS devices 14210, 14220, 14230, and 14240 are located at corners of their respective pixels, where the corners are immediately adjacent to each other. In other examples, the MEMS devices of pressure sensor 14310 could be located at extreme opposite corners of their respective pixels or at the same relative corner of each pixel or every other pixel. Such different configurations may be useful to establish a desired resolution or sensitivity of pressure sensor 14310.

Figure 15:
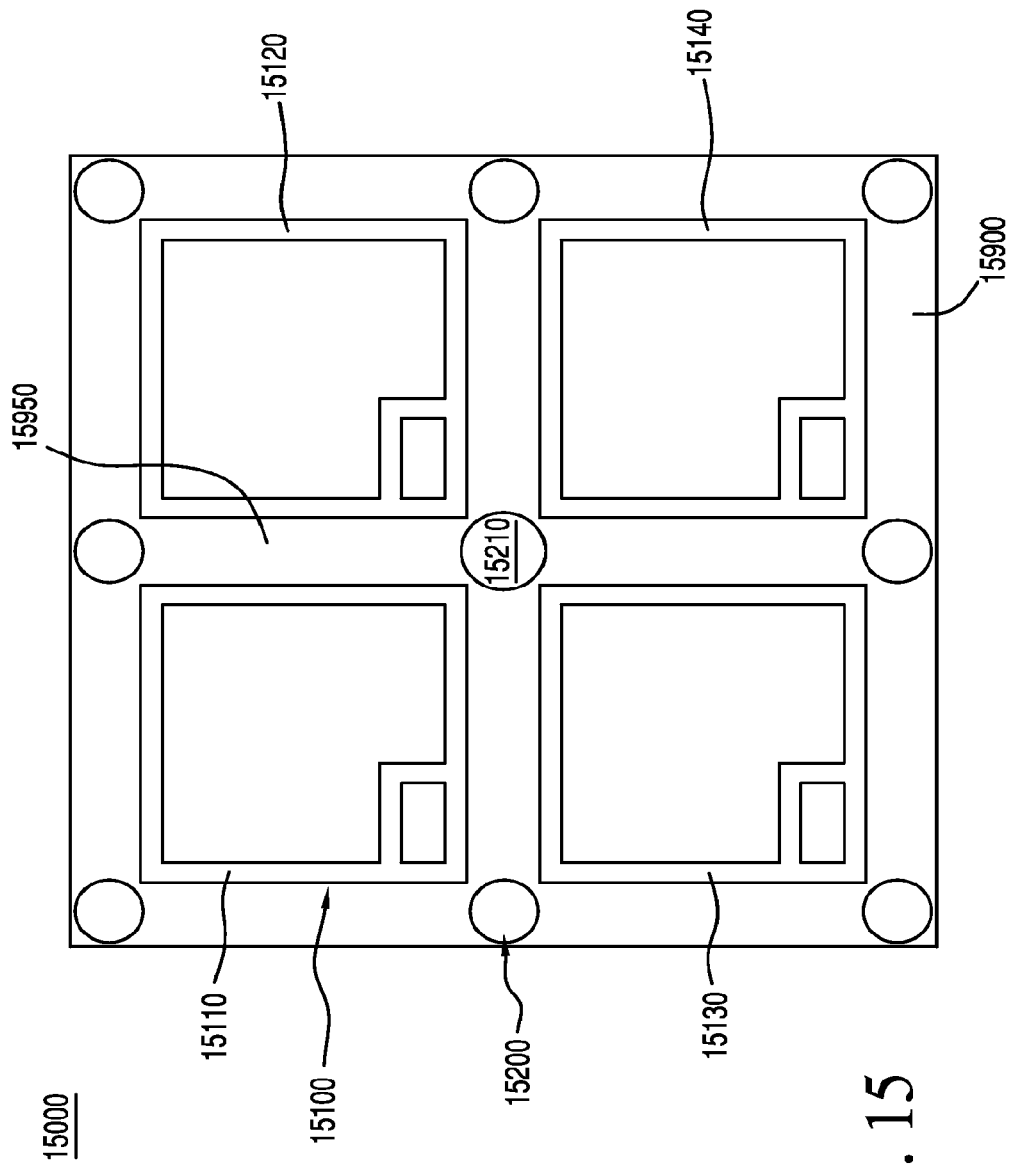
FIG. 15 illustrates a portion of a semiconductor device comprising a third pixel array along with a third MEMS array.

FIG. 15 illustrates a portion of semiconductor device 15000, comprising pixel array 15100 along with MEMS array 15200. Semiconductor device 15000 is similar to semiconductor device 14000 (FIG. 14). For example, pixel array 15100 can be similar to pixel array 14100 (FIG. 14), and includes pixels 15110, 15120, 15130, and 15140. MEMS array 15200 differs from MEMS array 14200 (FIG. 14), however, in that MEMS devices thereof, such as MEMS device 15210, can be located over pixel-free areas 15950 of substrate 15900, rather than within respective pixels of pixel array 15100. Such an arrangement may be useful, for example, in embodiments comprising pixel-free areas of sufficient size to accommodate the MEMS devices of MEMS array 15200 between the pixels of pixel array 15100, thereby limiting the effects of MEMS array 15200 on the aperture ratio of the pixels of pixel array 15100.

In the present embodiment, pixel free areas 15950 are located both within pixel array 15100, and outside a perimeter of pixel array 15100. In the same or other embodiments, the pixel free areas 15950 located within pixel array 15950 may be small enough so as to be nearly imperceptible to the naked eye, thereby limiting potential effects on the resolution or brightness of pixel array 15100. In other embodiments, pixel free areas 15950 located within pixel array 15100 may be limited to a periphery of the MEMS devices of MEMS array 15200. For example, one such pixel free area may exist around and/or within an area occupied by MEMS device 15210, between adjacent corners of pixels 15110, 15120, 15130, and 15140, where pixel free areas 15950 may be otherwise reduced or eliminated between other portions of adjacent pixels 15110, 15120, 15130, and 15140. There can also be embodiments where pixel free areas 15950, and corresponding MEMS devices of MEMS array 15200, are still located outside the perimeter of pixel array 15100, but not within pixel array 15100. In the same or other embodiments, pixel free areas 15950, and corresponding MEMS devices of MEMS array 15200, may be located outside a perimeter of a pixel array similar to pixel array 13100 (FIG. 13), pixel array 14100 (FIG. 14), and/or other pixel array having MEMS devices located within respective pixels. There can also be embodiments where pixel free areas 15950 outside the perimeter of pixel array 15100 are large enough to accommodate correspondingly larger MEMS devices and/or a greater number of MEMS devices of MEMS array 15200.

Figure 16:
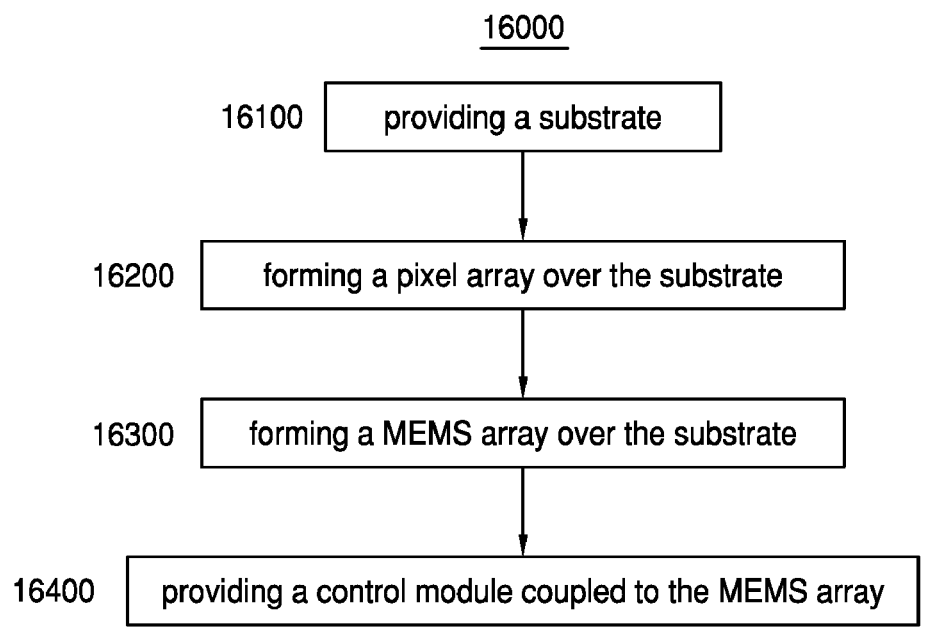
FIG. 16 illustrates a flowchart of a method for providing a semiconductor device comprising a pressure-sensitive display.

Moving along, FIG. 16 illustrates a flowchart for a method 16000 for providing a semiconductor device comprising a pressure-sensitive display. In some embodiments, the semiconductor device of method 16000 can be similar to one or more of semiconductor devices 13000 (FIG. 13), 14000 (FIG. 14), and/or 15000 (FIG. 15).

Block 16100 of method 16000 comprises providing a substrate. In some examples, the substrate of block 16100 can be similar to substrates 13900 (FIG. 13), 14900 (FIG. 14) and/or 15900 (FIG. 15). In the same or other embodiments, the substrate of block 16100 can be similar to the flexible substrate of block 410 of method 400 (FIG. 4). For example, the substrate of block 16100 can be flexible in some embodiments, as described above with respect to substrate 110 (FIGS. 1-3). In some embodiments, the substrate of block 16100 can be used as a base upon which the pressure-sensitive display of method 16000 can be built.

Block 16200 of method 16000 comprises forming a pixel array over the substrate of block 16100. In some examples, the pixel array of block 16200 can be similar to one or more of pixel arrays 13100 (FIG. 13), 14100 (FIG. 14), and/or 15100 (FIG. 15), formed over the substrate of block 16100 based on a suitable semiconductor process flow.

Block 16300 of method 16000 comprises forming a MEMS array over the substrate of block 16100, where the MEMS array can be similar to one or more of MEMS arrays 13200 (FIG. 13), 14200 (FIG. 14), and/or 15200 (FIG. 13) described above. The MEMS array of block 16300 comprises one or more MEMS devices, which can be formed using a method similar to that described above for method 400 (FIG. 4). In the same or other embodiments, forming the MEMS array can comprise forming at least a first MEMS device of the one or more MEMS devices to be pressure sensitive, such as to be able to sense and/or react to a situation where the display of method 16000 is touched, pressed, or otherwise contacted proximate to the first MEMS device.

In at least some embodiments, the pixel array of block 16200 and the MEMS array of block 16300 can be formed concurrently during the same semiconductor process flow, such as pursuant to block 450 of method 400 and/or as illustrated in FIG. 12. In such embodiments, blocks 16200 and 16300 occur simultaneously.

In the same or other embodiments, the MEMS devices of the MEMS array of block 16300 can be interspersed with the pixels of the pixel array of block 16200. Such interspersing can comprise several different configurations of location and spacing within and/or between the pixels and the MEMS devices, as exemplarily illustrated for the different configurations shown in FIGS. 13-15. For example, in one embodiment, a first MEMS device of the MEMS array of block 16300 can be formed within a first pixel of the pixel array of block 16200. In such an embodiment, each MEMS device of the MEMS array could be formed within a an individual corresponding pixel of the pixel array in a 1-to-1 relationship if desired, such as illustrated in FIGS. 13-14. In other examples, one or more of the MEMS devices of the MEMS array of block 16300 could be formed over one or more pixel-free areas of the substrate of block 16100, such as illustrated in FIG. 15. The interspersed configurations described above can be achieved as the MEMS array of block 16300 and the pixel array of block 16200 are simultaneously formed, such as by designing and using semiconductor photolithographic masks in accordance with the desired interspersed configuration.

In some embodiments, method 16000 can also comprise block 16400 for providing a control module coupled to the MEMS array of block 16300. In such embodiments, the control module can be similar to control module 13800, as described above with respect to FIGS. 13-14. For example, the control module can be configured to correlate and/or map a first pixel set of the pixel array of block 16200 with a first MEMS device of the MEMS array of block 16300. In the same or other embodiments, the first pixel set can comprise one or more of the pixels of the pixel array. In at least some embodiments, the first pixel set can be located proximate to and/or within a predetermined distance from the first MEMS device over the substrate of block 16100 pursuant to an interleaved configuration.

The first MEMS device of the MEMS array of block 16300 can be configured to generate a signal for the control module of block 16400 when the display of method 16000 is contacted proximate to the first pixel set. In some embodiments, as described above with respect to MEMS device 13210 and control module 13800, (FIG. 13), the control module of block 16400 can be configured to interpret a change in capacitance of the first MEMS device as the signal, where the change in capacitance can be caused, for example, by a flexing of a sensor membrane of the first MEMS device resulting from the contacting of the display proximate to the first MEMS device. In the same or other embodiments, the control module can be configured to interpret the signal as an actuation of an icon or other marker displayed proximate to the first pixel set at the display of method 16000.

In some embodiments, the control module of block 16400 can be configured to interpret signals from more than one MEMS device as pertaining or corresponding to the first pixel set. For example, the MEMS array of block 16300 can comprise a second MEMS device formed proximate to the first pixel set and/or to the first MEMS device, where the second MEMS device can be configured in combination with the first MEMS device to generate the signal for the control module of block 16400. The signal can be based on a combined capacitance of the first and second MEMS devices in some embodiments. In the same or other embodiments, the control module may consider the first and second MEMS devices to be a single pressure sensor correlated to the first pixel set.

In some examples, one or more of the different blocks of method 16000 can be combined into a single step or performed simultaneously, and/or the sequence of such blocks can be changed. For example, blocks 16200 and 16300 can be performed simultaneously. In the same or other examples, portions of block 16300 can be performed before block 16200 is completed. There can also be examples where method 16000 can comprise further or different procedures. As an example, a procedure could be added to couple the elements of blocks 16100, 16200, and 16300 with a housing. Other variations can be implemented for method 16000 without departing from the scope of the present disclosure.

Although the displays with embedded MEMS sensors and related methods herein have been described with reference to specific embodiments, various changes may be made without departing from the spirit or scope of the present disclosure. For example, even though openings 123 of MEMS device 120 have been presented as square-shaped, there can be embodiments with similar openings comprising other geometrical perimeters. As another example, although pressure sensor 13210 has been illustrated in FIG. 13 as comprising a round perimeter, there can be other embodiments where its perimeter comprises a different geometrical shape. Additional examples of such changes have been given in the foregoing description. Accordingly, the disclosure of embodiments herein is intended to be illustrative of the scope of the invention and is not intended to be limiting. It is intended that the scope of this application shall be limited only to the extent required by the appended claims. The displays with embedded MEMS sensors and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A semiconductor device, comprising:
a substrate;
a first MEMS device of one or more MEMS devices over the substrate;
a pixel array over the substrate, the pixel array comprising one or more pixels; and
a display comprising at least a portion of the one or more pixels of the pixel array; and
one or more pressure sensors;
wherein:
  a first pressure sensor of the one or more pressure sensors comprises the first MEMS device;
  the first pressure sensor is configured to detect when the display is contacted proximate to the first pressure sensor;
  the first MEMS device comprises:
    a capacitor having:
      an electrically conductive material located over the substrate;
      a sensor membrane movably suspended over the electrically conductive material; and
      a first dielectric located over the electrically conductive material and under the sensor membrane;
    and
    a round wall structure configured to support the sensor membrane over a gap between the electrically conductive material and the sensor membrane;
  and
  the sensor membrane is configured to move towards the electrically conductive material when the display is contacted proximate to the first pressure sensor.

2. The semiconductor device of claim 1, wherein:
the first pressure sensor further comprises a second MEMS device of the one or more MEMS devices; and
a sensitivity of the first pressure sensor is defined at least in part by a capacitance of the first MEMS device and a capacitance of the second MEMS device.

3. The semiconductor device of claim 1, wherein:
the sensor membrane comprises a second electrically conductive material.

4. The semiconductor device of claim 1, wherein:
the first pressure sensor is proximate to a first pixel set of the one or more pixels; and
the first pressure sensor is coupled to a control module configured to identify the first pixel set when the display is contacted proximate to the first pressure sensor.

5. The semiconductor device of claim 4, wherein:
the first pixel set comprises a single pixel of the one or more pixels proximate to the first pressure sensor.

6. The semiconductor device of claim 4, wherein:
the first pixel set comprises a plurality of pixels of the one or more pixels within a predetermined distance from the first pressure sensor.

7. The semiconductor device of claim 4, wherein:
the first pixel set comprises 9 pixels proximate to the first pressure sensor.

8. The semiconductor device of claim 1, wherein:
the one or more MEMS devices are formed simultaneously along with the pixel array.

9. The semiconductor device of claim 1, wherein:
the first MEMS device is located within a first pixel of the one or more pixels of the pixel array; and
the first pixel comprises an aperture ratio of at least approximately 50%.

10. The semiconductor device of claim 1, wherein:
the first MEMS device is located over a pixel-free area of the substrate adjacent to at least a first pixel of the one or more pixels of the pixel array.

11. The semiconductor device of claim 1, wherein:
the first MEMS device is located within a first pixel of the one or more pixels of the pixel array; and
the first MEMS device occupies at most approximately 25% of an area of the first pixel.

12. The semiconductor device of claim 1, wherein:
the substrate is flexible.

13. The semiconductor device of claim 1, wherein:
the substrate comprises at least one of:
  a PEN material, a PET material, a PES material, a polyimide, a polycarbonate, a cyclic olefin copolymer, or a liquid crystal polymer.

14. The semiconductor device of claim 1, wherein:
the first MEMS device comprises a radius of approximately 50 micrometers to approximately 75 micrometers.

15. The semiconductor device of claim 1, wherein:
the first MEMS device comprises at least one of:
  an active capacitance of approximately 3.0 picofarads to approximately 2.0 picofarads; or
  an inactive capacitance of approximately 2.0 picofarads to approximately 1.5 picofarads.

16. The semiconductor device of claim 1, wherein:
the pixel array comprises a pixel size of approximately 240*240 micrometers squared.

17. The semiconductor device of claim 1, wherein:
the first MEMS device of the one or more MEMS devices is located within a first pixel of the one or more pixels of the pixel array;
a second MEMS device of the one or more MEMS devices is located within a second pixel of the one or more pixels of the pixel array;
the first MEMS device is proximate to a first corner of the first pixel;
the second MEMS device is proximate to a second corner of the second pixel; and
the first corner of the first pixel is immediately adjacent to the second corner of the second pixel.

18. The semiconductor device of claim 17, wherein:
a third MEMS device of the one or more MEMS devices is located within a third pixel of the one or more pixels of the pixel array;
a fourth MEMS device of the one or more MEMS devices is located within a fourth pixel of the one or more pixels of the pixel array;
the third MEMS device is proximate to a third corner of the third pixel;
the fourth MEMS device is proximate to a fourth corner of the fourth pixel; and
the first, second, third, and fourth corners are immediately adjacent to each other.

19. The semiconductor device of claim 18, wherein:
the first pressure sensor comprises the first, second, third, and fourth MEMS devices.

20. A method comprising:
providing a substrate;
forming a pixel array over the substrate, the pixel array comprising one or more pixels;
forming a MEMS array over the substrate;
providing a display comprising at least a portion of the one or more pixels; and
providing one or more pressure sensors;
wherein:
    forming the MEMS array over the substrate comprises:
        forming at least a first MEMS device of the one or more MEMS devices;
    a first pressure sensor of the one or more pressure sensors comprises the first MEMS device;
    the first pressure sensor is configured to detect when the display is contacted proximate to the first pressure sensor;
    the first MEMS device comprises:
        a capacitor having:
            an electrically conductive layer over the substrate;
            a sensor membrane movably suspended over the electrically conductive layer; and
            a first dielectric located over the electrically conductive layer and under the sensor membrane; and
        a round wall structure configured to support the sensor membrane over a gap between the electrically conductive layer and the sensor membrane; and
    the sensor membrane is configured to move towards the electrically conductive layer when the display is contacted proximate to the first pressure sensor.

21. The method of claim 20, wherein:
forming the pixel array occurs simultaneously with forming the MEMS array.

22. The method of claim 20, wherein:
forming at least the first MEMS device comprises:
    providing a sacrificial structure over the electrically conductive layer; and
    providing the sensor membrane over the sacrificial structure, the sensor membrane comprising a second electrically conductive layer.

23. The method of claim 22, wherein:
providing the sacrificial structure comprises:
    providing a sacrificial layer over the electrically conductive layer; and
    providing the round wall structure at a perimeter of the sacrificial layer.

24. The method of claim 23, wherein:
forming at least the first MEMS device comprises:
    anchoring the sensor membrane over the round wall structure of the sacrificial structure;
    forming one or more openings through the sensor membrane; and
    removing the sacrificial layer via the one or more openings of the sensor membrane.

25. The method of claim 22, wherein:
forming at least the first MEMS device comprises:
    configuring the sensor membrane to vary a capacitance of the first MEMS device as the sensor membrane is flexed relative to the electrically conductive layer.

26. The method of claim 20, wherein:
forming at least the first MEMS device further comprises:
    forming the first MEMS device within a first pixel of the one or more pixels of the pixel array.

27. The method of claim 20, wherein:
forming the first MEMS device comprises:
    forming the first MEMS device over a pixel-free area of the substrate adjacent to at least a first pixel of the one or more pixels of the pixel array.

28. The method of claim 20, further comprising:
providing a control module coupled to the MEMS array;
wherein:
    forming the pixel array comprises:
        a first pixel set of the one or more pixels of the pixel array, the first pixel set proximate to the first MEMS device;
    providing the control module comprises:
        configuring the control module to correlate the first pixel set with the first MEMS device; and
    forming at least the first MEMS device comprises:
        configuring the first MEMS device to generate a signal for the control module when the display is contacted proximate to the first pixel set.

29. The method of claim 28, wherein:
forming the MEMS array further comprises:
    forming a second MEMS device of the one or more MEMS devices proximate to the first pixel set; and
    configuring the second MEMS device in combination with the first MEMS device to generate the signal for the control module.

30. The method of claim 29, wherein:
the signal is based on a combined capacitance of the first and second MEMS devices.

31. The method of claim 28, wherein:
providing the control module further comprises:
    configuring the control module to interpret the signal as an actuation of a marker displayed proximate to the first pixel set.

32. The method of claim 28, wherein:
providing the control module further comprises:
    configuring the control module to interpret a change in capacitance of the first MEMS device as the signal.

33. The method of claim 28, wherein:
forming the pixel array comprises:
    providing each pixel of the first pixel set within a predetermined distance from the first MEMS device.

34. The method of claim 20, wherein:
providing the substrate comprises:
    providing the substrate to be flexible.

35. A semiconductor device, comprising:
a substrate;
a first MEMS device of one or more MEMS devices over the substrate;
a pixel array over the substrate, the pixel array comprising one or more pixels; and
one or more pressure sensors;
wherein:
    a first pressure sensor of the one or more pressure sensors comprises the first MEMS device;
    the first MEMS device comprises a capacitor having:
        an electrically conductive material located over the substrate;
        a sensor membrane movably suspended over the electrically conductive material; and
        a round wall structure configured to support the sensor membrane over a gap between the electrically conductive material and the sensor membrane; and
    the sensor membrane is configured to move towards the electrically conductive material when the display is contacted proximate to the first pressure sensor.

36. The semiconductor device of claim 35, wherein:
the first pressure sensor further comprises a second MEMS device of the one or more MEMS devices; and
a sensitivity of the first pressure sensor is defined at least in part by a capacitance of the first MEMS device and a capacitance of the second MEMS device.

37. The semiconductor device of claim 35, further comprising:
a display comprising at least a portion of the one or more pixels of the pixel array;
wherein:
    the substrate is flexible;
    the first pressure sensor is configured to detect when the display is contacted proximate to the first pressure sensor;
    the capacitor of the first MEMS device further comprises:
    the first MEMS device comprises a capacitor having:
        a first dielectric located over the electrically conductive material and under the sensor membrane;
    the sensor membrane comprises a second electrically conductive material;
    the first pressure sensor is proximate to a first pixel set of the one or more pixels; and
    the first pressure sensor is configured to be coupled to a control module configured to identify the first pixel set when the display is contacted proximate to the first pressure sensor.

38. The method of claim 20, wherein:
forming the MEMS array over the substrate comprises:
    interspersing the MEMS array with the pixel array over the substrate.

* * * * *